(12) United States Patent
Kitahara et al.

(10) Patent No.: US 7,109,638 B2
(45) Date of Patent: Sep. 19, 2006

(54) PIEZOELECTRIC ACTUATOR, TIMEPIECE, AND ELECTRONIC DEVICE

(75) Inventors: Joji Kitahara, Suwa (JP); Shigeaki Seki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/060,521

(22) Filed: Feb. 17, 2005

(65) Prior Publication Data
US 2005/0184621 A1 Aug. 25, 2005

(30) Foreign Application Priority Data
Feb. 19, 2004 (JP) .............................. 2004-042396

(51) Int. Cl.
H02N 2/12 (2006.01)
H01L 41/08 (2006.01)

(52) U.S. Cl. ........................ 310/323.16; 310/323.01; 310/323.17; 310/328

(58) Field of Classification Search .......... 310/323.16, 310/323.01, 323.17, 328, 330, 331, 365
See application file for complete search history.

(56) References Cited

U.S. PATENT DOCUMENTS
6,909,222 B1 * 6/2005 Sawada ...................... 310/328
2004/0017131 A1 1/2004 Sawada et al.

FOREIGN PATENT DOCUMENTS
EP 1 075 079 A1 2/2001
JP 2001-286166 10/2001

* cited by examiner

*Primary Examiner*—Darren Schuberg
*Assistant Examiner*—Derek Rosenau
(74) *Attorney, Agent, or Firm*—Mark P. Watson

(57) ABSTRACT

A piezoelectric actuator A has an oscillator 10 that has a flat base layer 32 and piezoelectric elements 30, 31 layered on the base layer 32 and oscillates as a result of a drive signal applied to the piezoelectric elements 30, 31, and a rotor 100 driven by vibrations from the oscillator 10. The piezoelectric actuator A includes a fastening part 11 for securing the oscillator 10, and lead substrates 14A, 14B that are secured to the fastening part 11 for applying a drive signal to the piezoelectric elements from a drive circuit 500 for driving the piezoelectric elements 30, 31. The lead substrates 14A, 14B have connecting parts 17A–17C extending to the power supply electrodes 33A, 33C and a detection electrode 34.

9 Claims, 20 Drawing Sheets

| | LONGITUDINAL OSCILLATION FREQUENCY | SECONDARY BENDING OSCILLATION FREQUENCY |
|---|---|---|
| WITH CONTACT PART | 281kHz | 290kHz |
| WITHOUT CONTACT PART | 279kHz (284.3kHz) | 286kHz (288.36kHz) |
| FREQUENCY DIFFERENCE | 2kHz | 4kHz |

PIEZOELECTRIC ACTUATOR, TIMEPIECE, AND ELECTRONIC DEVICE

BACKGROUND OF THE INVENTION

1. Field of the Invention

The present invention relates to a piezoelectric actuator having a piezoelectric element, a timepiece having this piezoelectric actuator, and an electronic device.

2. Description of the Related Art

Piezoelectric elements feature excellent response and high conversion efficiency converting electrical energy to mechanical energy. As a result, various types of piezoelectric actuators using the piezoelectric effect of such piezoelectric elements have been developed in recent years and are used in such applications as piezoelectric buzzers, ultrasonic motors, and inkjet heads for printers. Piezoelectric actuators have also been proposed for use in applications with a strong need for miniaturization, such as driving the calendar display mechanism in wristwatches. (See, for example, Japanese Unexamined Patent Appl. Pub. 2001-286166.)

However, a problem is that wiring must be provided to the piezoelectric elements using wire leads, for example, in order to supply a drive signal to the piezoelectric elements, and this wiring task is complex.

SUMMARY OF THE INVENTION

The present invention is directed to the foregoing problem, and an object of this invention is to provide a piezoelectric actuator that makes wiring the piezoelectric elements simple, a timepiece having this piezoelectric actuator, and an electronic device.

To achieve the foregoing object, a piezoelectric actuator according to the present invention has an oscillator having an oscillator that has a flat base layer and a piezoelectric element layer on the base layer, and the oscillator vibrates as a result of a drive signal applied to the piezoelectric element layer, and a driven member that is driven by vibration of the oscillator. The piezoelectric actuator comprises a fastening part that secures the oscillator, and a lead substrate secured to the fastening part for applying a drive signal from a drive circuit for driving the piezoelectric element layer. The lead substrate has a conductive member that extends to an electrode on the piezoelectric element layer.

Because the lead substrate has a conductive member for wiring the piezoelectric element when thus comprised, the present invention simplifies electrically wiring the lead substrate to the piezoelectric element, and thus simplifies assembly.

Preferably, the lead substrate has an insulation layer and a conductive film positioned on the insulation layer, and the conductive member is formed as an extension of the conductive film. Because the conductive member is used for wiring with this arrangement, the load of the wiring on the oscillator is reduced and the oscillator can thus be driven to oscillate stably.

Further preferably, the conductive member is formed from a conductive elastic member that applies pressure to the electrode. More specifically, the lead substrate comprises a metal layer and an insulation layer or insulation sheet covering a surface of the metal layer; and the conductive member is a flat spring connected or formed integrally with the metal layer. This arrangement facilitates assembly because soldering or another bonding method is not required for wiring to the piezoelectric elements.

Yet further preferably, the oscillator has a first piezoelectric element layer on a front side of the base layer and a second piezoelectric element layer on a back side of the base layer. The lead substrate comprises a first lead substrate secured to a front side of the fastening part, and a second lead substrate secured to a back side of the fastening part. Also, the conductive member comprises a first conductive member extending from the first lead substrate to an electrode on the first piezoelectric element layer, and a second conductive member extending from the second lead substrate to an electrode on the second piezoelectric element layer. Also, it is preferable that the piezoelectric actuator has a conductive part that provides conductivity between the first and second lead substrates.

In a further preferred arrangement, the oscillator has a first piezoelectric element layer on a front side of the base layer and a second piezoelectric element layer on a back side of the base layer. The lead substrate is flexible and has a first end secured on the front side of the fastening part and a second end secured on the back side of the fastening part. Also, the conductive member comprises a first conductive member extending from the first end of the lead substrate to the first piezoelectric element layer, and a second conductive member extending from the second end of the lead substrate to the second piezoelectric element layer.

These desirable arrangements of the present invention do not need to route lines connected to the lead substrate from a piezoelectric element on one side of the base layer around to a piezoelectric element on the other side. Therefore, compared with an arrangement in which wiring is extended from a single lead substrate to piezoelectric elements on the front and back sides of a base layer, the configuration of the present invention reduces the load of the wiring on the oscillator and can thus cause the oscillator to vibrate stably.

Yet further preferably, the piezoelectric actuator also has a height adjusting member between the lead substrates and fastening part so that the conductive member extending from the lead substrate is higher than the piezoelectric element. Because the conductive members are thus not carried by the piezoelectric elements when the conductive members are wired to the piezoelectric elements, the load of the wiring on the oscillator is reduced and the oscillator can be driven to oscillate stably.

Yet further preferably, the lead substrate is fixed to the fastening part, forming a single unit. In this preferred embodiment of the invention the fastening part and lead substrate are preferably positioned by a positioning member.

This aspect of the invention makes assembling the piezoelectric actuator easier. The positioning precision of the fastening part to the lead substrates is also improved.

A piezoelectric actuator according to the present invention can be used in a timepiece or various electronic devices.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

A. Overall Configuration

Figure 1:
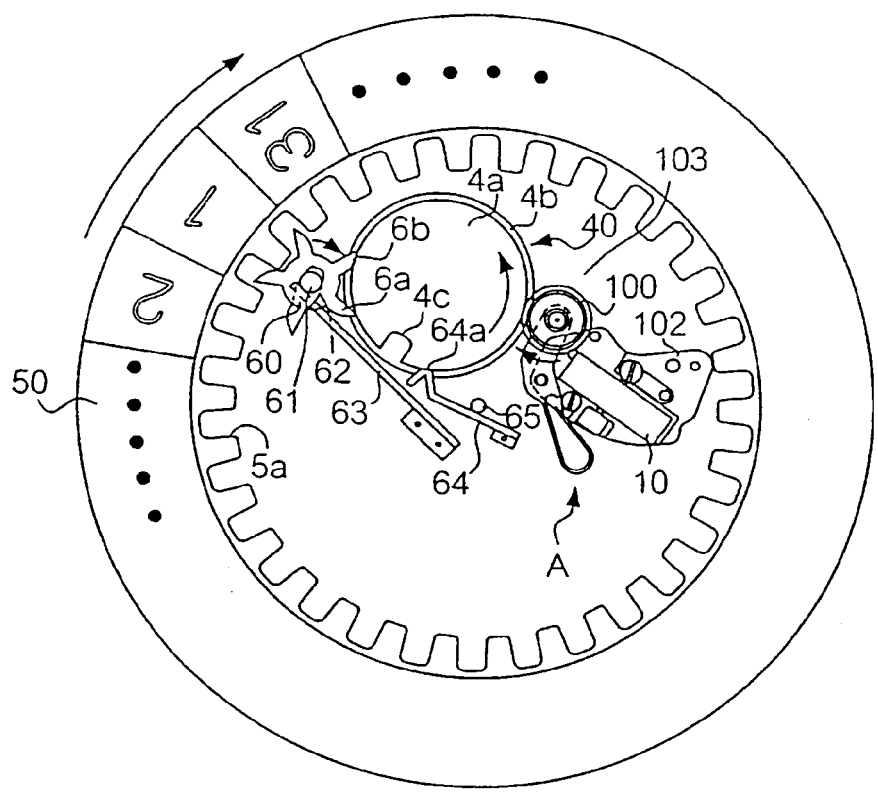
FIG. 1 is a plan view showing the calendar display mechanism of a timepiece according to an embodiment of the present invention.

FIG. 1 is a plan view showing the arrangement of a calendar display mechanism having a piezoelectric actuator A according to this embodiment of the invention arranged in a wristwatch. As shown in FIG. 1, this piezoelectric actuator A has a base plate 102, a rectangular oscillator 10, and a rotor 100. The rotor 100 is the driven member that is driven by the oscillator 10. Vibration of the oscillator 10 against the outside surface of the rotor 100 causes the rotor 100 to rotate clockwise and transfer drive power to the date display wheel 50. This rotor 100 is connected to the ring-shaped date display wheel 50 through an intervening speed-reducing gear train containing the date-turning intermediate wheel 40 and date-turning wheel 60. This date display wheel 50 is driven by the rotor 100, and the date display wheel 50 is rotationally driven in conjunction with rotor 100 drive.

Figure 2:
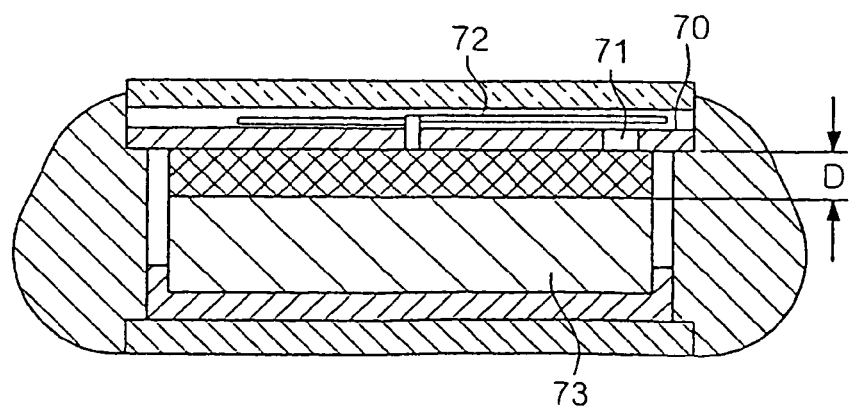
FIG. 2 is a schematic section view showing the arrangement of a timepiece according to the same embodiment of the invention.

FIG. 2 is a section view of the timepiece shown in FIG. 1. The calendar display mechanism containing this piezoelectric actuator A is assembled in the crosshatched portion of this figure. A round dial 70 is positioned above this calendar display mechanism. A window 71 for displaying the date is contained in a portion of the outside edge part of the dial 70 so that the date on the date display wheel 50 can be seen through this window 71. The movement 73 for driving the hands 72 and a drive circuit 500 described further below are positioned below the dial 70.

B. Arrangement of the Calendar Display Mechanism

Figure 3:
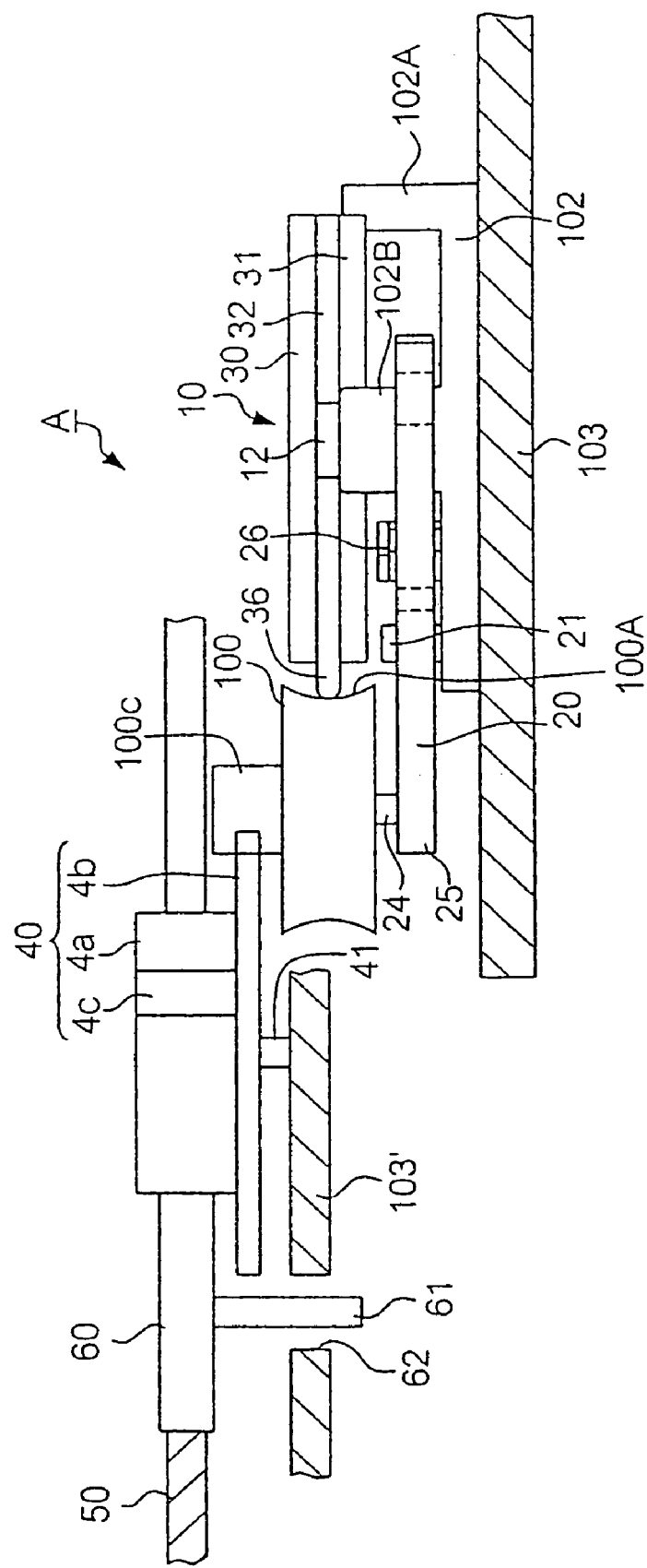
FIG. 3 is a section view showing major parts of the calendar display mechanism in the same embodiment of the invention.

FIG. 3 is a section view showing in detail the arrangement of the calendar display mechanism shown in FIG. 1. As shown in FIG. 3, this timepiece has a first bottom plate 103 and a second bottom plate 103' positioned at a different elevation from the first bottom plate 103. The parts of the calendar display mechanism other than the piezoelectric actuator A are positioned on the second bottom plate 103', and the piezoelectric actuator A is positioned on the first bottom plate 103.

As shown in FIG. 3, a shaft 41 for axially supporting the date-turning intermediate wheel 40 projects from the second bottom plate 103'. A bearing (not shown) is positioned on the bottom side of the date-turning intermediate wheel 40, and the distal end of this shaft 41 is housed inside this bearing. The date-turning intermediate wheel 40 has a small diameter portion 4a and a large diameter portion 4b. The small diameter portion 4a is cylindrical with a slightly smaller diameter than the large diameter portion 4b, and a substantially square notch 4c is formed in the outside surface of the small diameter portion 4a. This small diameter portion 4a is fixed concentrically with the large diameter portion 4b. A gear 100c at the top of the rotor 100 engages the large diameter portion 4b. Thus comprising this large diameter portion 4b and small diameter portion 4a, the date-turning intermediate wheel 40 rotates on the shaft 41 in conjunction with rotation of the rotor 100.

As shown in FIG. 1, the date display wheel 50 is ring-shaped with an internal gear 5a formed on the inside circumference thereof. The date-turning wheel 60 is a five-tooth gear that meshes with the internal gear 5a. As also shown in FIG. 3, a shaft 61 is positioned at the center of the date-turning wheel 60, and this shaft 61 is fit freely in a through-hole 62 formed in the second bottom plate 103'. This through-hole 62 is formed in an eyebrow shape extending in the circumferential direction of the date display wheel 50. One end of a flat spring 63 is fixed to the bottom plate 103' and the other end urges the shaft 61 clockwise to the top right as seen in FIG. 1. The spring 63 thus urges the shaft 61 and date-turning wheel 60. The urging action of this spring 63 prevents the date display wheel 50 from rocking.

One end of another flat spring 64 is fastened by screw to the bottom plate 103' and the distal end 64a of the spring 64 is bent substantially into a V shape. Contact 65 is positioned so that the contact 65 touches the spring 64 when the date-turning intermediate wheel 40 turns and the distal end 64a of the spring 64 slips into the notch 4c. A specific voltage is applied to the spring 64, and this voltage is thus applied to the contact 65 when the spring 64 and contact 65 touch. That the date is being advanced can thus be detected by detecting the voltage of the contact 65. Note that a manual drive wheel that engages the internal gear 5a could be provided to drive the date display wheel 50 when the user manipulates the crown (neither shown in the figures) in a conventional manner.

Thus comprised, the oscillator 10 of this piezoelectric actuator A vibrates within the plane containing the surface of the oscillator 10 when a drive voltage is applied from the drive circuit 500. As the oscillator 10 vibrates against the outside surface of the rotor 100, the rotor 100 is rotationally driven clockwise as indicated by the arrow shown in FIG. 1. This rotation of the rotor 100 is transferred through the date-turning intermediate wheel 40 to the date-turning wheel 60, and the date-turning wheel 60 thus drives the date display wheel 50 in the clockwise direction.

C. Arrangement of the Piezoelectric Actuator

Figure 4:
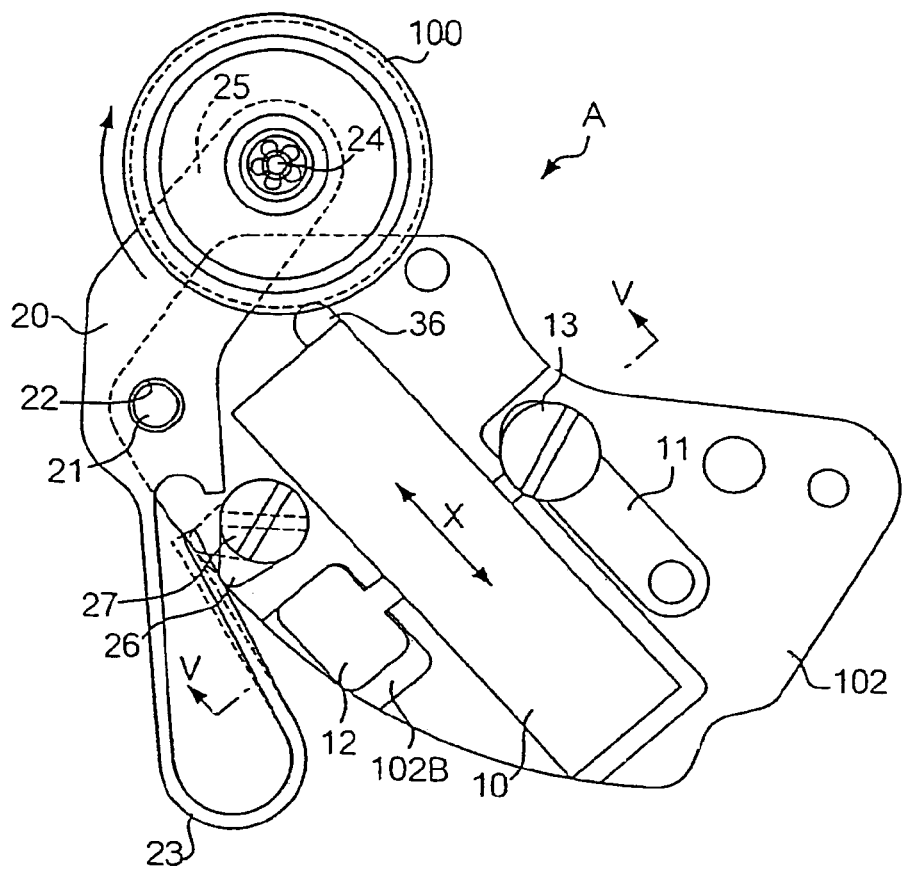
FIG. 4 is a plan view showing the configuration of a piezoelectric actuator in the same embodiment of the invention.
Figure 5:
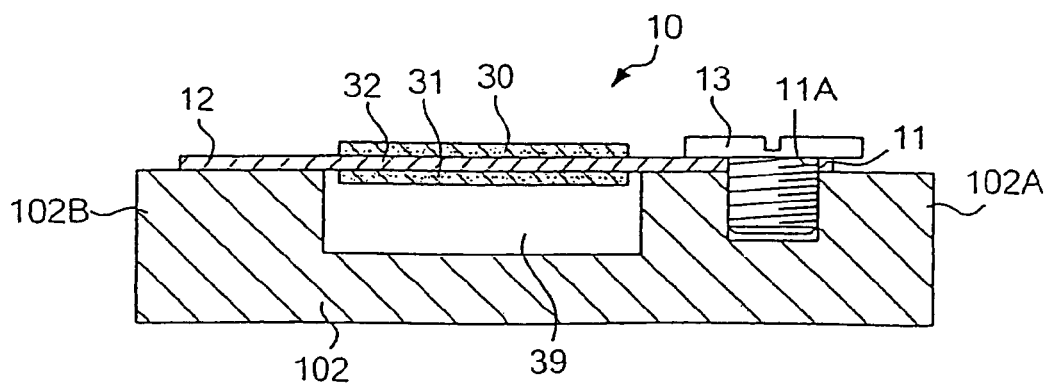
FIG. 5 is a section view through arrows V—V in FIG. 4.
Figure 6:
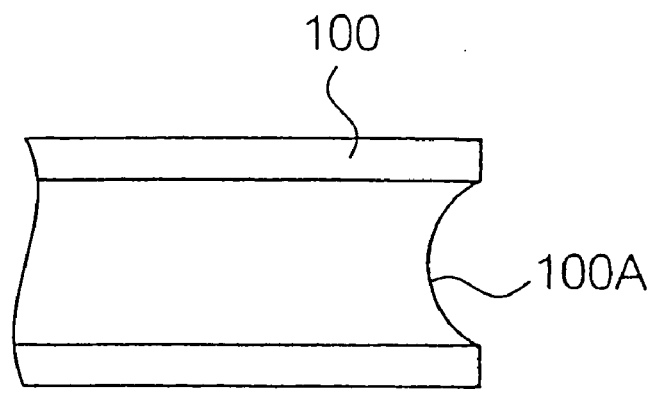
FIG. 6 is a side view from the side of the rotor in the same embodiment of the invention.
Figure 7:
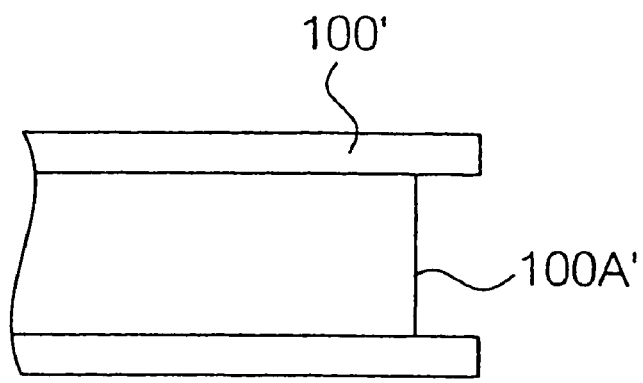
FIG. 7 is a side view from the side of the rotor in the same embodiment of the invention.
Figure 8:
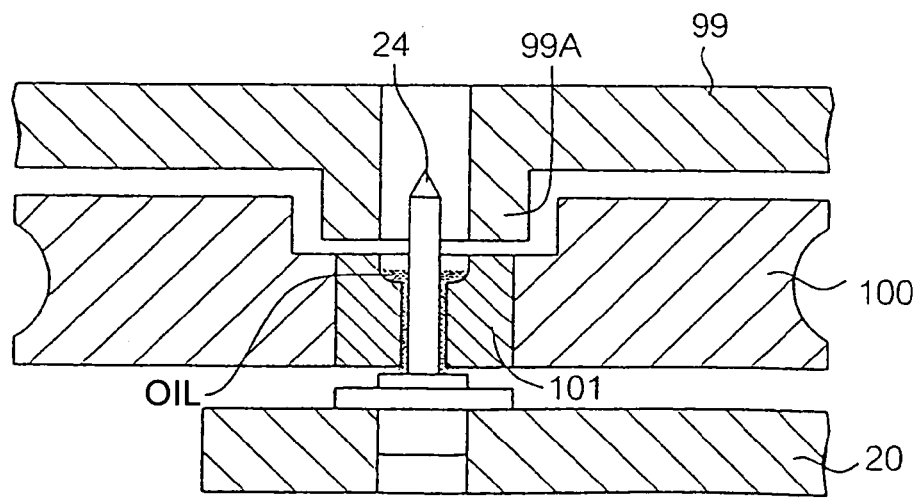
FIG. 8 is a section view showing the rotor support structure in the same embodiment of the invention.
Figure 9:
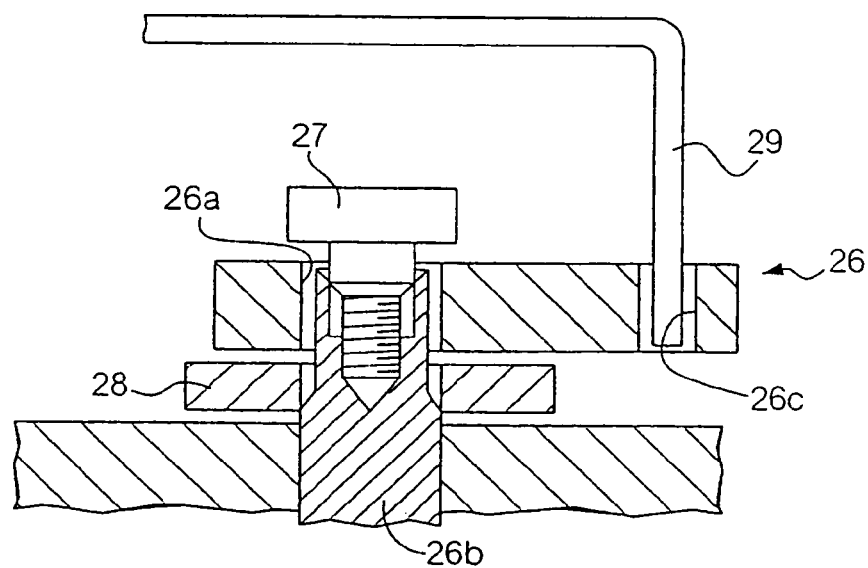
FIG. 9 is a section view showing the pressure adjusting mechanism and adjusting method of a piezoelectric actuator in the same embodiment of the invention.
Figure 10:
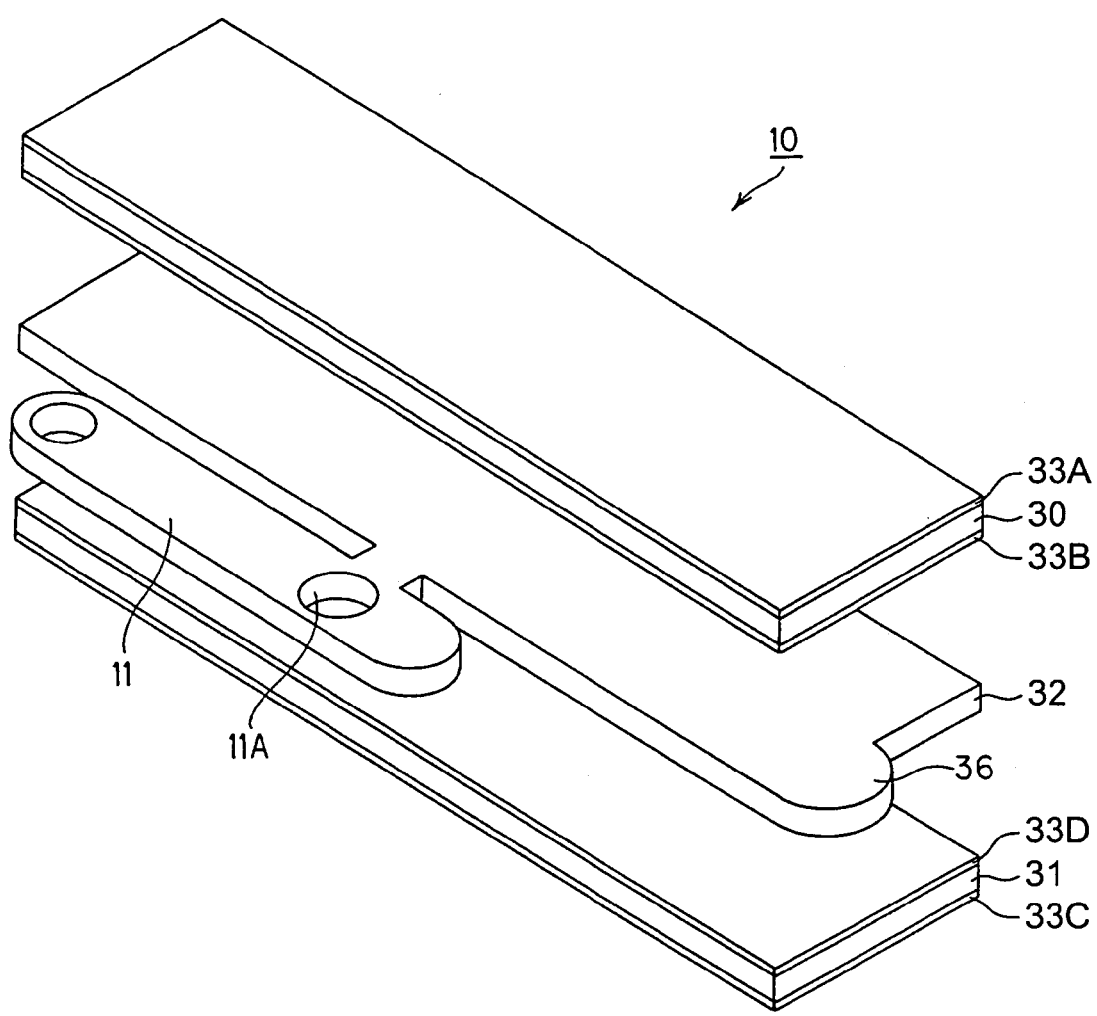
FIG. 10 is a partially exploded oblique view showing the oscillator of a piezoelectric actuator in the same embodiment of the invention.
Figure 11:
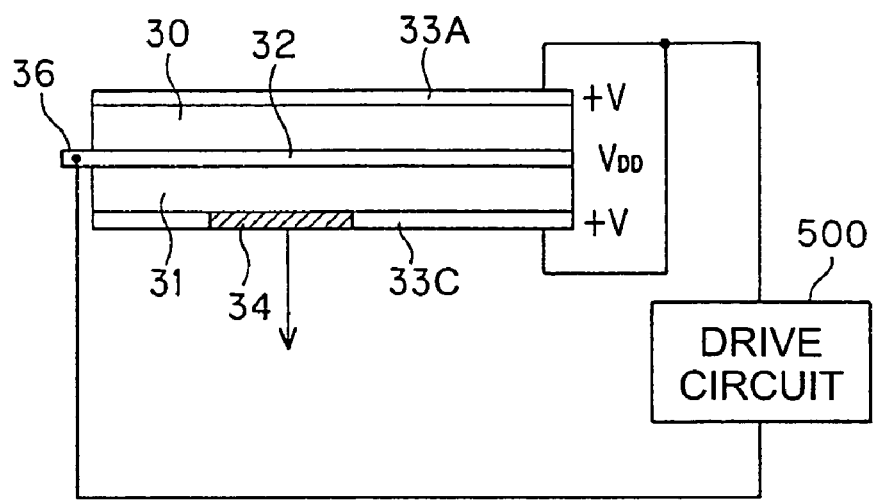
FIG. 11 shows the drive arrangement for supplying a drive signal to a piezoelectric element in the same embodiment of the invention.
Figure 12:
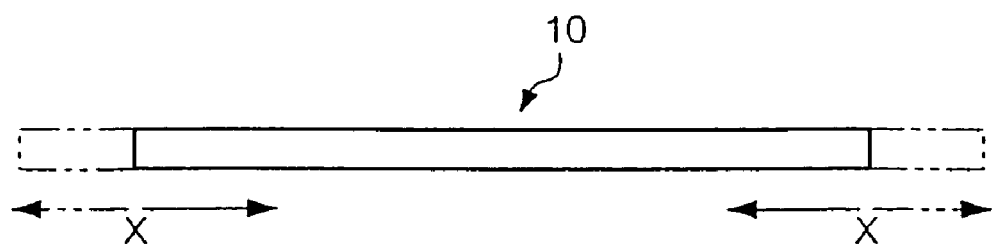
FIG. 12 is a schematic view showing the longitudinal oscillation mode of the oscillator in the same embodiment of the invention.
Figure 13:
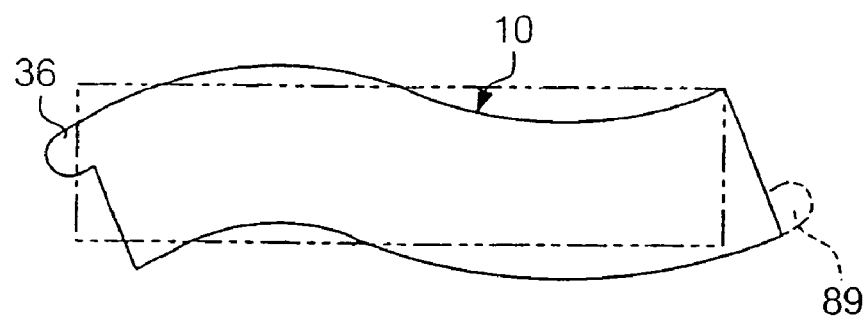
FIG. 13 is a schematic view showing the bending oscillation mode of the oscillator in the same embodiment of the invention.
Figure 14:
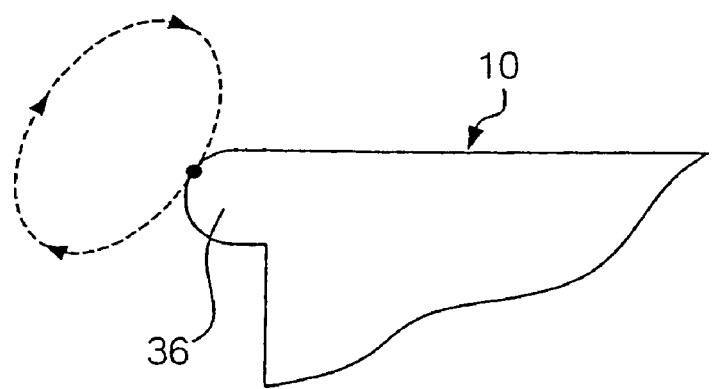
FIG. 14 shows the path of the contact part of the oscillator in the same embodiment of the invention.
Figure 15:
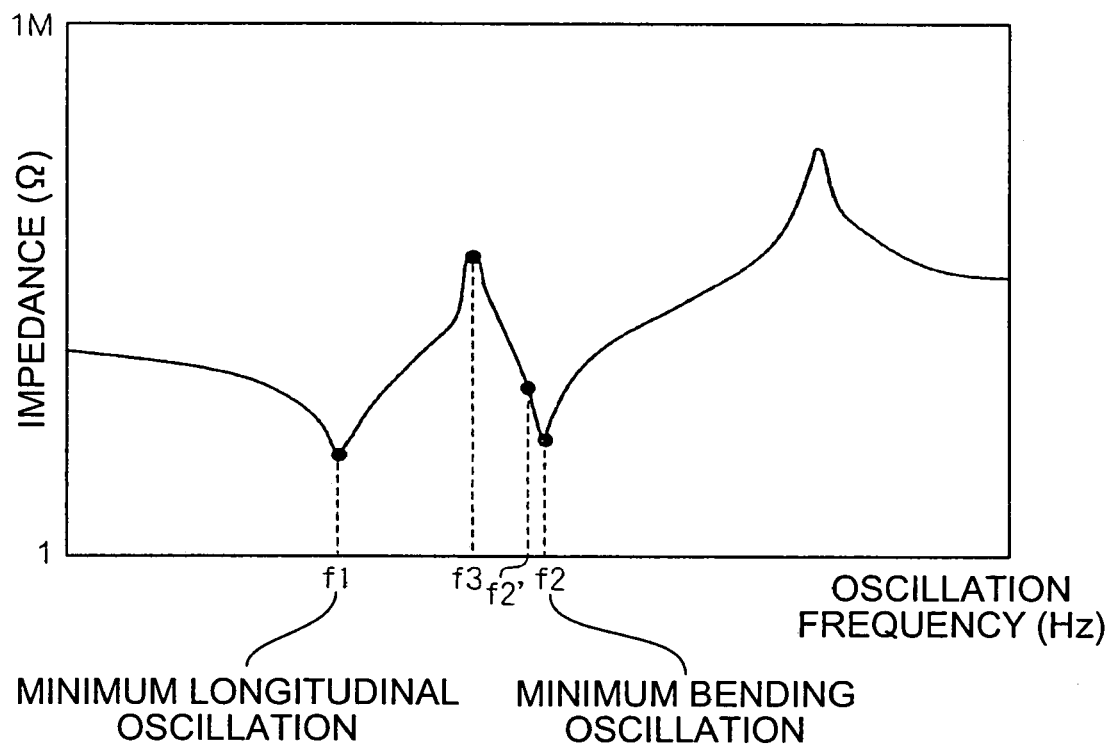
FIG. 15 shows an example of the relationship between impedance and the oscillation frequency of the oscillator.

FIG. 4 is a plan view of the piezoelectric actuator A. FIG. 5 is a section view through section V—V shown in FIG. 4. FIG. 6 and FIG. 7 are enlarged views of the rotor 100. FIG. 8 is a section view showing the support structure of the rotor 100. FIG. 9 is a section view describing how the pressure is adjusted using the pressure adjusting cam. FIG. 10 is an exploded oblique view of the oscillator 10. FIG. 11 is a drive schematic showing supplying a drive signal to the piezoelectric element. FIG. 12 to FIG. 14 show the oscillation states of the oscillator. FIG. 15 shows the relationship between impedance and the oscillation frequency of the oscillator 10.

As shown in FIG. 4, the oscillator 10 has a flat rectangular shape. As shown in FIG. 10, this oscillator 10 has a layered structure with a base layer 32 positioned between two rectangular piezoelectric elements 30, 31. The base layer 32 is a conductor such as stainless steel that has substantially the same rectangular shape as these piezoelectric elements 30, 31 and is thinner than the piezoelectric elements 30, 31. A fastening part 11 is formed on one of the two long sides of the base layer 32. As shown in the figure, the fastening part 11 has an elongated shape parallel to the long sides of the base layer 32. A positioning hole 11A is also formed in the fastening part 11.

As shown in FIG. 4 and FIG. 5, the oscillator 10 is fastened to the fastening part mounting portion 102A of the base plate 102 by screwing a screw 13 through the positioning hole 11A into the fastening part mounting portion 102A. A supporting contact portion 12 is also formed on the base layer 32 on the side opposite the fastening part 11, and it too projects from the piezoelectric elements 30, 31. This supporting contact portion 12 is placed on the supporting contact portion mounting portion 102B of the base plate 102 as shown in FIG. 5.

As shown in FIG. 5, the oscillator 10 is positioned with the fastening part 11 and supporting contact portion 12 placed on the base plate 102 and projecting on either side from the part of the base layer 32 positioned between the piezoelectric elements 30, 31. The oscillator 10 is thus mounted to the base plate 102 by the fastening part 11 and supporting contact portion 12 with a space 39 formed between the base plate 102 and the base layer 32 and piezoelectric elements 30, 31. While the supporting contact portion 12 rests on the base plate 102, the fastening part 11 is firmly fastened by a screw 13 to the base plate 102.

As shown in FIG. 4 and FIG. 10, a contact part 36 is further provided that protrudes from the base layer 32. This contact part 36 is set against the outside surface of the rotor 100. The contact part 36 could be conductive or non-conductive, but if the contact part 36 is non-conductive, the base plate 102 and piezoelectric elements 30, 31 can be prevented from shorting through the rotor 100, which is generally metal. The shaft 24 that rotationally supports the rotor 100 could also be dielectrically treated to prevent this shorting.

In plan view, the contact part 36 projects toward the rotor 100 and has an arc-shaped end. Because the part of the contact part 36 that contacts the rotor 100 is thus curved, a part of the outside surface of the arc-shaped contact part 36 will always contact the outside surface of the round rotor 100 with the same contact area even when the relative positions of the rotor 100 and oscillator 10 change due to dimensional variation, for example. Stable contact can thus be assured between the rotor 100 and contact part 36.

As shown in FIG. 3 and FIG. 6, a channel 100A that is arc-shaped in section is formed circumferentially on the outside surface of the rotor 100. Separation of the rotor 100 is also prevented by the contact part 36 contacting the bottom of this channel 100A. Furthermore, because the channel 100A is formed with an arc-shaped (curved) section and the contact part 36 that contacts this channel 100A is also arc-shaped, the channel 100A and contact part 36 touch at a point, thereby assuring the stable transfer of energy. Note further, that this channel could alternatively be rectangular in shaped as indicated by the channel 100A' of rotor 100' shown in FIG. 7.

As shown in FIG. 3 and FIG. 4, a through-hole 22 is formed in the lengthwise middle portion of the arm of a lever 20, and a shaft 21 rising from the base plate 102 passes through this through-hole 22. The lever 20 is supported pivotably on the base plate 102 by thus passing this shaft 21 through the through-hole 22. A substantially U-shaped spring part 23 is also formed at one end of the lever 20. A rotor mounting part 25 having a shaft 24 is further positioned on the other end of the lever 20, and the rotor 100 is rotationally axially supported by the shaft 24.

How the rotor 100 is attached to this shaft 24 is described in detail with reference to FIG. 8.

The movement 73 located below the dial 70 generally has a bottom plate 103 (FIG. 3) and pressure plate 99, the pressure plate 99 applying pressure to the bottom plate 103 and thereby fixing the parts of the movement 73. As a result, the rotor 100, which is axially supported on the shaft 24 of the lever 20, is secured by the annular pedestal 99A of the pressure plate 99.

Durability and strength are required in the bearing of the rotor 100 because the rotor 100 pushes against the contact part 36 of the oscillator 10 as noted above. A ruby material with high wear resistance is therefore used for the bearing 101. Wear resistance can be further improved by lubricating the area between this bearing 101 and the shaft 24. This bearing 101 shall not be so limited, however, and any high wear resistance bearing can be used. The gap above and below the rotor 100 is determined on the top side as seen in the figures by the annular pedestal 99A of the pressure plate 99, and on the bottom side by a flange on the shaft 24. Note also that the gap is adjusted where the diameter of the rotor 100 is relatively small, that is, at the bearing 101. The torque load applied to the rotor 100 is thereby reduced.

Returning to FIG. 4, the pressure adjusting cam 26 pushes against the distal end part of the spring part 23. As shown in FIG. 9, this pressure adjusting cam 26 has a through-hole 26A. A screw-receiving part 26B planted in the base plate 102 is fit into this through-hole 26A, and the inside of the screw-receiving part 26B is threaded to receive a screw 27. A spacer 28 intervenes between the pressure adjusting cam 26 and base plate 102, and tightening the screw 27 fixes the pressure adjusting cam 26 to the base plate 102 while restricting rotary movement of the pressure adjusting cam 26.

Loosening the screw 27 enables the pressure adjusting cam 26 to turn rotationally around the screw 27. The user can insert a substantially L-shaped adjustment terminal 29 in the terminal guide hole 26C rendered in the pressure adjusting cam 26, and by manually turning this adjustment terminal 29 can easily adjust the rotation of the pressure adjusting cam 26.

Pressure from the pressure adjusting cam 26 on the spring part 23 reduces the gap between the two legs of the U-shaped spring part 23 as shown in FIG. 4. The elastic force produced in the spring part 23 at this time works to rotate the rotor mounting part 25 clockwise around the shaft 21. As a result, the outside surface of the rotor 100 mounted on the rotor mounting part 25 is pressed against the contact part 36.

Thus comprised, the pressure applied to the oscillator 10 can be adjusted by adjusting the pressure adjusting cam 26. If the pressure adjusting cam 26 is turned to greatly deform the spring part 23 as indicated by the dotted line in FIG. 4, the rotor mounting part 25 is displaced clockwise as seen in the figure around the shaft 21 in resistance to the elastic force of the spring part 23, and the pressure applied by the rotor 100 to the oscillator 10 increases. If the pressure adjusting cam 26 is adjusted so that the gap between the two legs of the spring part 23 increases as indicated by the solid line in the figure, the elastic force of the spring part 23 decreases and the pressure applied by the rotor 100 to the oscillator 10 decreases. Note that the pressure adjusting cam 26 can be adjusted manually or the pressure adjusting cam 26 can be adjusted automatically by an automated assembly machine used for automatically assembling timepiece movements.

The oscillator 10 is described next with reference to FIG. 10.

As described above, the oscillator 10 has a layered structure with a flat base layer 32 positioned between piezoelectric elements 30, 31. This arrangement improves durability and decreases damage to the oscillator 10 due to excessive oscillation amplitude or external shock caused by being dropped, for example. Furthermore, using a member that is thinner than the piezoelectric elements 30, 31 for the base layer 32 significantly avoids interference with vibration of the piezoelectric elements 30, 31. Further, because the fastening part 11, supporting contact portion 12, and contact part 36 described above are formed integrally with the base layer 32, the manufacturing process can also be simplified.

Rectangular power supply electrodes 33A, 33B are bonded on the front and back sides of the piezoelectric element 30 on the top side of the base layer 32 so as to substantially cover the surface of the piezoelectric element 30. Rectangular power supply electrodes 33C, 33D are likewise bonded on the front and back sides of the piezoelectric element 31 on the bottom side of the base layer 32 so as to substantially cover the surface of the piezoelectric element 31. A rectangular detection electrode 34 (see FIG. 17) extending toward one end from substantially the lengthwise center of the oscillator 10 is also formed on power supply electrode 33C, and is electrically isolated from other areas of the detection electrode 33C by a cut that separates portion 34 from the rest of 33C. This detection electrode 34 is used to acquire a detection signal indicating oscillation of the oscillator 10.

Materials that can be used for the piezoelectric elements 30, 31 include zirconium lead titanate (PZT (R)), quartz, lithium niobate, barium titanate, lead titanate, lead metaniobate, polyvinylidene fluoride, lead zinc niobate, and lead scandium niobate. The formula for lead zinc niobate is $[Pb(Zn_{1/3}-Nb_{2/3})O_3]_{1-X}(PbTiO_3)_X]$ (where X varies according to the composition and X=0.09 approximately). The formula for lead scandium niobate is $[Pb((Sc_{1/2}-Nb_{1/2})_{1-X}Ti_X)O_3]$, (where X varies according to the composition and X=0.09 approximately).

If the polarization direction of piezoelectric element 30 is opposite the polarization direction of piezoelectric element 31, an AC drive signal is supplied from the drive circuit 500 to the power supply electrode 33A, base layer 32, and power supply electrode 33C so that the potential of the power supply electrode 33A, base layer 32, and power supply electrode 33C goes to +V, $V_{DD}$, and +V (or −V, $V_{DD}$, −V) where $V_{DD}$ is the ground potential of the drive circuit 500. Note that the +V drive signal and the −V drive signal are AC signals of opposite phase. Note, further, that because the base layer 32 is a conductor, the power supply electrodes 33B and 33D contacting the piezoelectric elements 30, 31 can be omitted, and are therefore not shown in FIG. 11.

When AC drive signals are thus supplied to the piezoelectric elements 30, 31 of an oscillator 10 thus comprised from the drive circuit 500 via the power supply electrodes 33A to 33D, a longitudinal oscillation mode in which the piezoelectric elements 30, 31 expand and contract lengthwise is produced in the piezoelectric elements 30, 31. The piezoelectric elements 30, 31 thus produce a longitudinal oscillation of expansion and contraction lengthwise to the piezoelectric elements as indicated by arrows X in FIG. 4 and FIG. 12.

The combination of longitudinal oscillation produced in the oscillator 10 and the rotational moment centered on the center of gravity of the oscillator 10 resulting from an imbalance in the weight distribution of the oscillator 10 produces a bending oscillation as shown in FIG. 13. When both this longitudinal oscillation and bending oscillation are applied to the rotor 100, contact between the contact part 36 of the oscillator 10 and the outside surface of the rotor 100 produces a clockwise vibration along an elliptical path as shown in FIG. 14. That is, the point of contact between the contact part 36 and the rotor 100 is greatly displaced. Note that even greater bending oscillation can be induced and an even greater rotational moment can be produced by providing a balance portion 89 on the end of the oscillator 10 opposite the contact part 36 (see FIG. 16, for example).

The oscillator 10 thus produces oscillation combining longitudinal oscillation and bending oscillation, but whether the longitudinal oscillation mode is dominant or the bending oscillation mode is dominant depends on the frequency of the drive signal supplied to the piezoelectric elements 30, 31. FIG. 15 shows an example of the relationship between the oscillation frequency of the oscillator 10 and impedance. As shown in the figure, the resonance frequency f1 at which longitudinal oscillation mode impedance is lowest, and the resonance frequency f2 at which the bending oscillation impedance is lowest, are different. As a result, the piezoelectric elements 30, 31 vibrate in a longitudinal oscillation mode and bending oscillation is induced if the piezoelectric elements 30, 31 are driven at a frequency f2' between the resonance frequency f2 of the bending oscillation mode and the frequency f3 at which impedance is greatest between resonance frequency f1 and resonance frequency f2. Furthermore, driving the piezoelectric elements 30, 31 at a frequency f2' near the resonance frequency f2 of the bending oscillation mode produces a large bending oscillation, and the contact part 36 of the oscillator 10 traces a larger elliptical path. Because the ellipse traced by the contact part 36 thus increases in size, the torque applied to the rotor 100 by the contact part 36 also increases, and drive efficiency improves. Drive efficiency as used herein is defined by the work done by the rotor 100 per unit time (that is, speed vs torque load) relative to the electrical energy supplied to the piezoelectric elements 30, 31.

Thus, when the contact part 36 is positioned projecting toward to the rotor 100 as a result of the contact part 36 drawing a clockwise elliptical path, the pressure exerted by the contact part 36 on the rotor 100 increases, and when the contact part 36 rotates to a position retracted from the rotor 100, the pressure exerted by the contact part 36 on the rotor 100 decreases. Therefore, while both forces are great, that is, when the contact part 36 projects toward the rotor 100, the piezoelectric actuator A rotationally drives the rotor 100 in the displacement direction of the contact part 36.

D. Manufacturing and Connecting Wiring to the Piezoelectric Elements 30, 31

The method of manufacturing and connecting wiring to the piezoelectric elements 30, 31 is described next.

Figure 16:
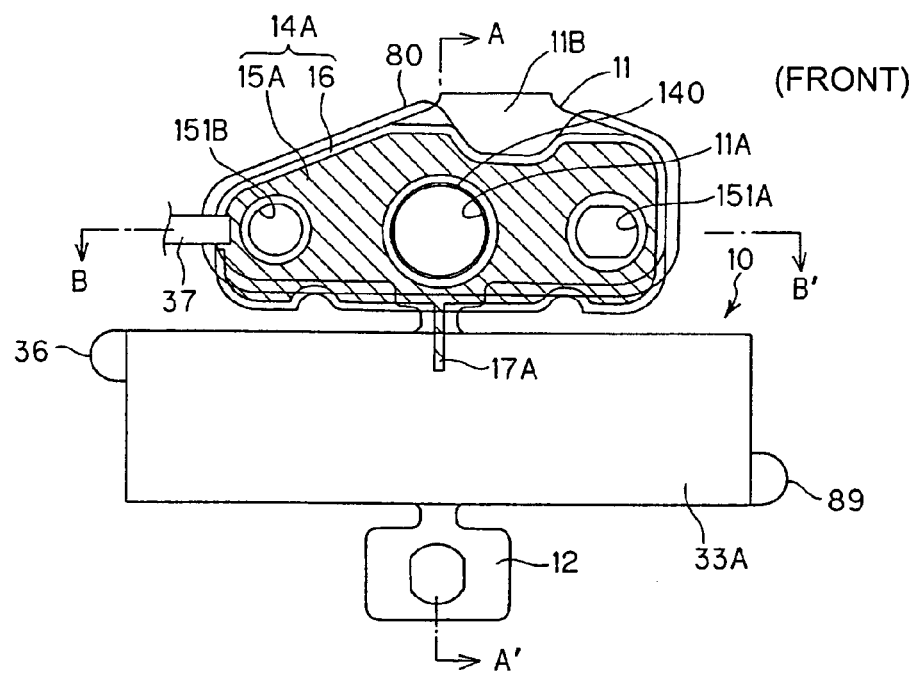
FIG. 16 is a plan view showing the front side of the oscillator in the same embodiment of the invention.
Figure 17:
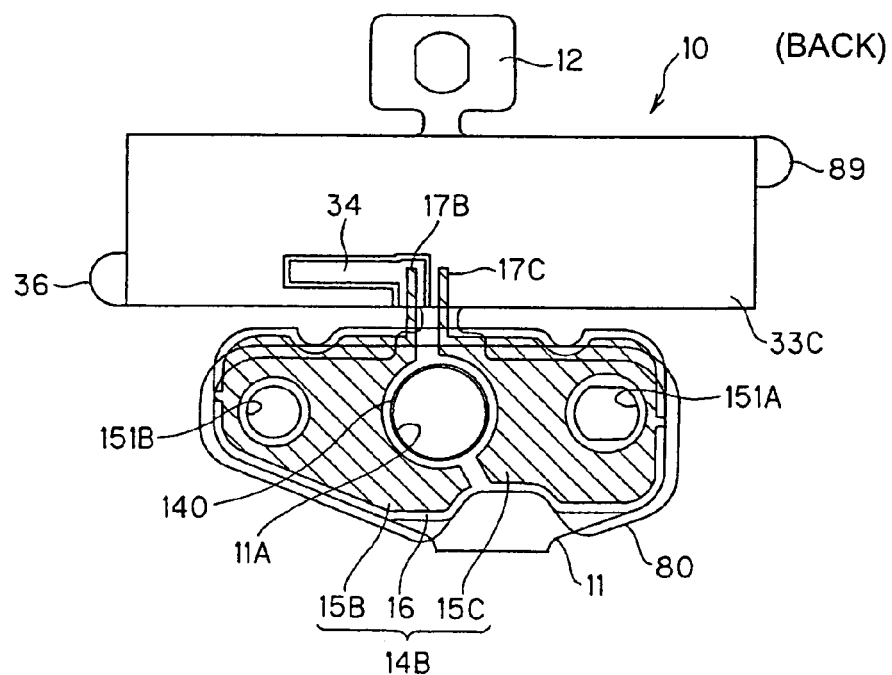
FIG. 17 is a plan view showing the back side of the oscillator in the same embodiment of the invention.
Figure 18:
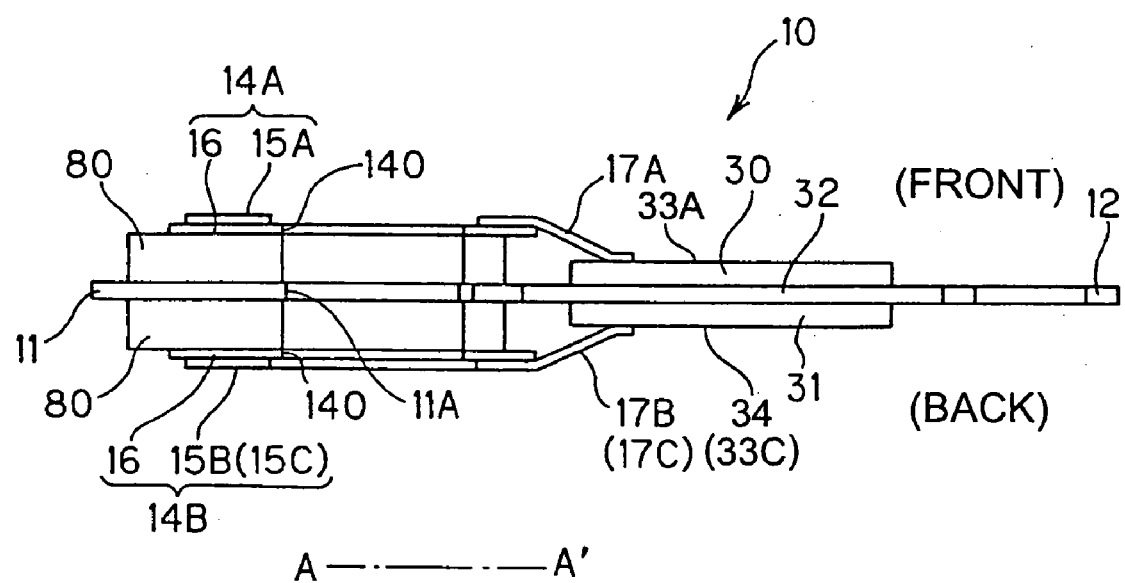
FIG. 18 is a section view through line A–A' in FIG. 16.

FIG. 16 is a plan view showing the top (front) of the oscillator 10, FIG. 17 is a plan view showing the bottom (back) of the oscillator 10, and FIG. 18 is a section view through line A–A' in FIG. 16. Note that the power supply electrodes 33A and 33C and detection electrode 34 are not shown in the section view shown in FIG. 18.

Two lead substrates 14A, 14B are used, one for drive signal input lines for supplying drive signals from the drive circuit 500 to the power supply electrodes 33A, 33C attached to the piezoelectric elements 30, 31 to apply drive signals to the oscillator 10, and one for detection signal output lines for supplying detection signal output from the detection electrode 34 of the piezoelectric element 31 to the drive circuit 500 to output the oscillation state of the oscillator 10. As shown in FIG. 16 to FIG. 18, these lead substrates 14A, 14B are connected to the fastening part 11 of the oscillator 10. More specifically, a height adjusting member 80 is fixed to the top and bottom sides of the fastening part 11 by adhesion or welding, and the lead substrates 14A, 14B are fixed by adhesion or welding to the height adjusting member 80. The height adjusting member 80 is used so that the elevation of the lead substrates 14A, 14B is above the piezoelectric elements 30, 31 referenced to the base layer 32 (fastening part 11).

The lead substrates 14A, 14B have a conductive film of copper foil 15 on an insulation layer 16 made of polyimide, for example. More specifically, substantially the entire top surface of the lead substrate 14A on the front side of the fastening part 11 is covered by a single copper foil 15A layer. Connecting part 17A extends copper foil 15A toward the oscillator 10. As shown in FIG. 18, this connecting part 17A is formed as an overhang from the insulation layer 16 and functions as the wire (conducting member) connecting the lead substrate 14A and power supply electrode 33A with the distal end of the connecting part 17A connected to the power supply electrode 33A. The connection between the connecting part 17A and power supply electrode 33A is made by soldering or low resistance welding to assure the reliability of the connection.

As shown in FIG. 17, the top surface of the lead substrate 14B on the back side of the fastening part 11 is covered by two physically isolated layers of copper foil 15B, 15C, and connecting parts 17B, 17C are formed on the copper foil 15B, 15C layers as overhangs projecting from the insulation layer 16 toward the oscillator 10. Connecting part 17B functions as the line connecting the lead substrate 14B to the detection electrode 34, and connecting part 17C functions as the line connecting the lead substrate 14B to the power supply electrode 33C. The distal end of the connecting part 17B is thus connected to the power supply electrode 34 attached to the surface of the piezoelectric element 31, and the distal end of the connecting part 17C is connected to the detection electrode 33C. Similarly to connecting part 17A, the connections between these connecting parts 17B, 17C and the detection electrode 34 and power supply electrode 33C are also made by soldering or low resistance welding to assure connection reliability.

The connecting parts 17A, 17B, 17C formed as extensions of the copper foil layers 15A, 15B, 15C on lead substrates 14A, 14B are thus used as the wiring lines for connection to the power supply electrodes 33A, 33C and detection electrode 34 in this embodiment of the invention. This arrangement simplifies the task of making wiring connections, and thus affords more efficient assembly when compared with connecting the oscillator 10 to the lead substrates 14A, 14B by using separate wiring leads or other discrete members. Furthermore, because the load of the wiring on the oscillator 10 can also be reduced, oscillation of the oscillator 10 can be stabilized, and the effect on the movement of the piezoelectric actuator A can be minimized as a result.

Furthermore, the connection to the piezoelectric element 30 on the front side of the base layer 32 is made from the lead substrate 14A on the top side of the fastening part 11, and the connection to the piezoelectric element 31 on the back of the base layer 32 is made from the lead substrate 14B on the bottom of the fastening part 11. In an arrangement in which connections to piezoelectric elements 30, 31 on opposite sides of a base layer 32 are made from a single lead substrate, the line from the lead substrate must be routed from the piezoelectric element on the front around to the piezoelectric element on the back of the base layer 32. Such routing is not necessary with the arrangement of the present invention, however, and the load of wiring on the oscillator 10 can therefore be reduced and vibration of the oscillator 10 can be stabilized.

Because the power supply electrodes 33A, 33C and detection electrode 34 are positioned at locations corresponding to nodes in the vibration of the oscillator 10 in this embodiment of the invention, separation of the connecting parts 17A–17C connected to the power supply electrodes 33A, 33C and detection electrode 34 due to vibration of the oscillator 10 can be prevented. Furthermore, because particularly high connection strength is not required between the connecting parts 17A–17C and the power supply electrodes 33A, 33C and detection electrode 34, making the connections between the connecting parts 17A–17C and power supply electrodes 33A, 33C and detection electrode 34 is easier, and assembly performance is improved.

This embodiment of the invention further uses an intervening height adjusting member 80 to assemble the lead substrates 14A, 14B to the fastening part 11. Therefore, when connecting the connecting parts 17A, 17B, 17C extending from the lead substrates 14A, 14B to the power supply electrodes 33A, 33C and detection electrode 34, the connecting parts 17A, 17B, 17C do not bear on the piezoelectric elements 30, 31. Instead, the connecting part 17A extends directly to the power supply electrode 33A from above the piezoelectric element 30, and connecting parts 17B, 17C extend directly to the power supply electrode 33C and detection electrode 34 from below the piezoelectric element 31. As a result, the load applied by the connecting parts 17A, 17B, 17C on the oscillator 10 can be reduced.

Drive signals of the same phase are supplied to the power supply electrode 33A and power supply electrode 33C in this embodiment of the invention. More specifically, the copper foil 15A connected to the power supply electrode 33A and the copper foil 15C connected to the power supply electrode 33C are electrically connected and drive signals of the same phase are supplied to the power supply electrodes 33A, 33C. This arrangement is further described below with reference to FIG. 19.

Figure 19:
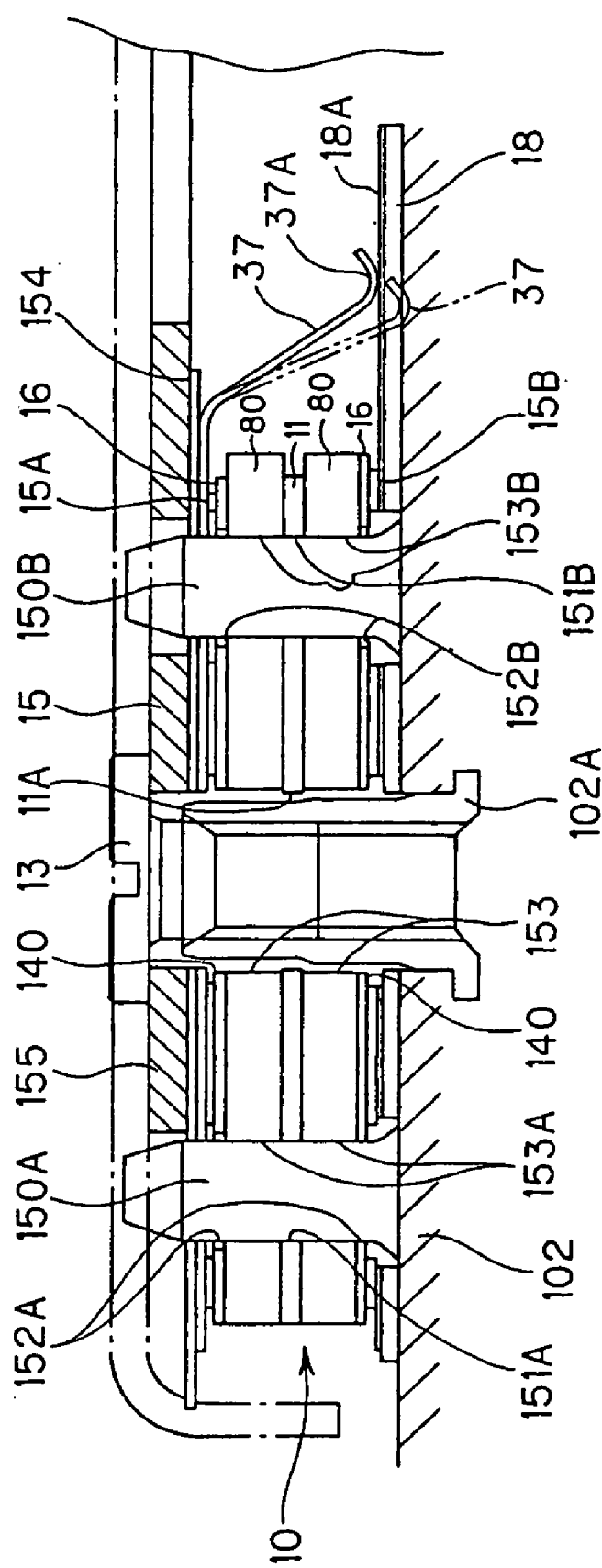
FIG. 19 is a section view through line B–B' in FIG. 16.

FIG. 19 is a section view through line B–B' in FIG. 16. The circuit board 18 on which the drive circuit 500 is mounted is positioned on the base plate 102 with the side of the circuit board 18 on which the copper foil 18A conduction pattern is provided facing up as shown in this figure. The lead substrate 14B on the bottom of the fastening part 11 is pressed from above against the circuit board 18, thereby directly connecting the copper foil 18A of the circuit board 18 to the copper foil 15B, 15C of the lead substrate 14B, and thus electrically connecting the circuit board 18 and lead substrate 14B.

As shown in FIG. 19 and FIG. 16, a conduction spring 37 extending from the lead substrate 14A toward the circuit board 18 is positioned next to the copper foil 15A of the lead substrate 14A on the top side of the fastening part 11. As indicated by the imaginary line in FIG. 19, the distal end 37A of this conduction spring 37 extends to a position below where the circuit board 18 is positioned. As a result, when the fastening part 11 is assembled to the base plate 102, the conduction spring 37 (after assembly) is deflected upwards and the distal end 37A presses against the copper foil 18A on the top of the circuit board 18. The copper foil 18A on the circuit board 18 and the copper foil 15A on the lead substrate 14A are thus electrically connected. Because the circuit board 18 and lead substrate 14B are electrically connected as discussed above, conduction is also established between the lead substrate 14A and lead substrate 14B.

Figure 20:
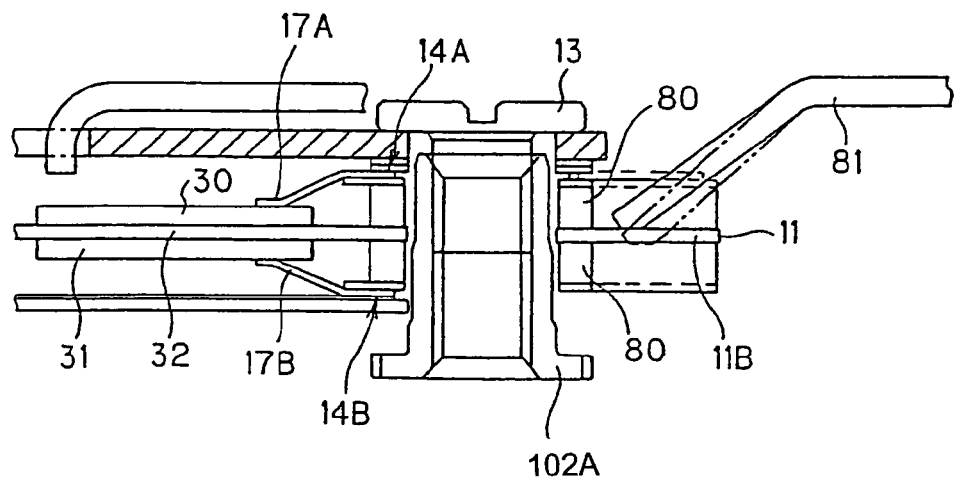
FIG. 20 shows the wiring to the base of the oscillator in the same embodiment of the invention.

As noted above, the ground potential $V_{DD}$ of the drive circuit 500 is applied to the base layer 32. This $V_{DD}$ voltage is applied to the base layer 32 by applying $V_{DD}$ to the fastening part 11 of the base layer 32 in this embodiment of the invention. More specifically, as shown in FIG. 16, the lead substrate 14A positioned on the top side of the fastening part 11 does not completely cover the surface of the fastening part 11 when seen from above, but instead leaves a part of the fastening part 11 exposed. As shown in FIG. 20, a ground conductor 81 providing a connection to the ground potential (voltage $V_{DD}$) of the drive circuit 500 (the foregoing circuit board 18) is connected to this exposed part 11B.

As a result, the copper foil 15A connected to the power supply electrode 33A and the copper foil 15C connected to the power supply electrode 33C are electrically connected, drive signals of the same phase can be supplied to the power supply electrodes 33A, 33C, and voltage $V_{DD}$ can be applied to the base layer 32.

In this embodiment of the invention the oscillator 10 and lead substrates 14A, 14B are assembled as a unit, and conductivity to the circuit board 18 is made when this unit assembled into the piezoelectric actuator A. This arrangement is described below.

As shown in FIG. 19, two guide pins 150A, 150B project from the base plate 102 in addition to the fastening part mounting portion (threaded pin) 102A. As shown in FIG. 16 to FIG. 18, two pin holes 151A, 151B through which the guide pins 150A, 150B pass are formed in the fastening part 11 in addition to the positioning hole 11A to which the fastening part mounting portion 102A is inserted. As shown in FIG. 19, positioning hole 140 and pin holes 152A, 152B to which the base plate 102 and guide pins 150A, 150B are inserted are also formed in the lead substrates 14A, 14B, and positioning hole 153 and pin holes 153A, 153B to which the fastening part mounting portion 102A and guide pins 150A, 150B are inserted are likewise formed in the height adjusting member 80.

The fastening part 11, lead substrates 14A, 14B, and height adjusting member 80 are thus layered in the order lead substrate 14B, height adjusting member 80, fastening part 11, height adjusting member 80, and lead substrate 14A, and are fixed by adhesion or welding, for example. The various members are positioned so that the respectively formed positioning holes and pin holes overlap. The connecting part 17A extending from the copper foil 15A of the lead substrate 14A is also bonded to the power supply electrode 33A. The connecting part 17B extending from the copper foil 15B on lead substrate 14B is bonded to the detection electrode 34. The connecting part 17C extending from the copper foil 15C on the lead substrate 14B is bonded to the power supply electrode 33C. The lead substrates 14A, 14B are thus assembled in unity with the fastening part 11, and the oscillator 10 and lead substrates 14A, 14B thus form a single unit.

The oscillator 10 thus integrated with the lead substrates 14A, 14B is assembled to the base plate 102 by fitting the fastening part 11 to the fastening part mounting portion 102A and guide pins 150A, 150B projecting from the base plate 102. The distal end 37A of the conduction spring 37 positioned next to the lead substrate 14A also presses against the copper foil 18A of the circuit board 18 positioned on the base plate 102, thereby establishing conductivity between the lead substrate 14A and circuit board 18. In addition, the copper foil 15B, 15C on the lead substrate 14B touches the copper foil 18A of the circuit board 18, thereby providing conductivity between the lead substrate 14B and circuit board 18. When the fastening part 11 to by which the lead substrates 14A, 14B are held is fit to the fastening part mounting portion 102A and guide pins 150A, 150B, the lead substrates 14A, 14B are positioned relative to the circuit board 18 by mounting portion 102A and guide pins 150A, 150B, and do not need to be individually positioned.

Furthermore, after mounting the oscillator 10 to the base plate 102, the top of the lead substrate 14A is covered by insulation layer 154 and thus electrically isolated from the other parts of the wristwatch, and a pressure plate 155 is then positioned over the insulation layer 154. When a screw 13 is then inserted and tightened to the fastening part mounting portion 102A from above this pressure plate 155, the screw 13 pushes against the pressure plate 155, thereby pressing the oscillator 10 to the base plate 102 and removing any looseness between the base plate 102 and oscillator 10. The pressure from the pressure plate 155 also assures a positive connection between the lead substrate 14A and conduction spring 37 and between the lead substrate 14B and circuit board 18.

Because the oscillator 10 and lead substrates 14A, 14B form an integrated unit in this embodiment of the invention, assembly, including mounting the oscillator 10 to the base plate 102 and connecting the oscillator 10 to the circuit board 18, is easier and quality can be stabilized. Furthermore, because common parts, that is, the fastening part mounting portion 102A and guide pins 150A, 150B, are used for positioning the fastening part 11 and lead substrates 14A, 14B, the fastening part 11 and lead substrates 14A, 14B do not need to be positioned individually.

It should be noted that the lead substrates 14A, 14B are connected to the piezoelectric elements 30, 31 using extensions of the copper foil layers 15A, 15B, 15C on the lead substrates 14A, 14B in this embodiment of the invention. The invention shall not be so limited, however. For example, an arrangement in which a flat spring is connected individually to each of the lead substrates 14A, 14B and used to wire the lead substrates 14A, 14B to the piezoelectric elements 30, 31 could alternatively be used. This arrangement is further described with reference to FIG. 21 to FIG. 23.

Figure 21:
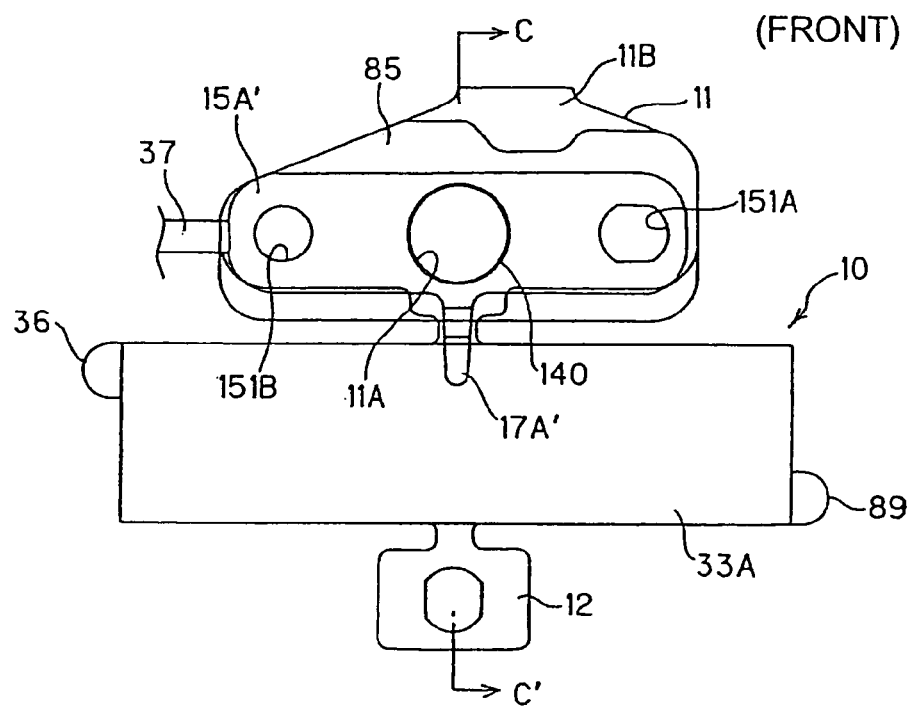
FIG. 21 is a plan view showing the front side of the oscillator in another embodiment of the invention.
Figure 22:
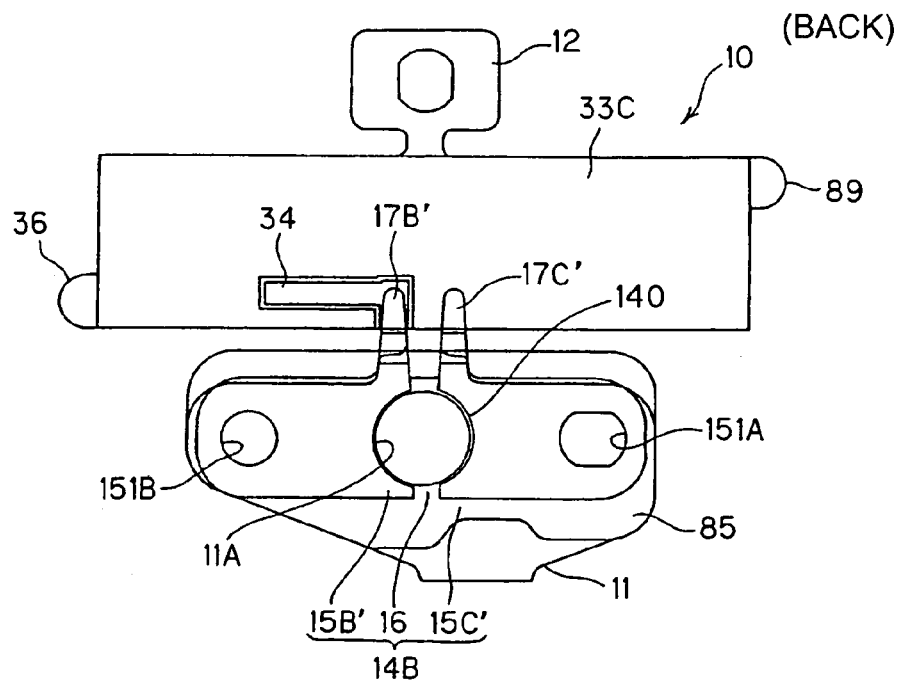
FIG. 22 is a plan view showing the back side of the same oscillator.
Figure 23:
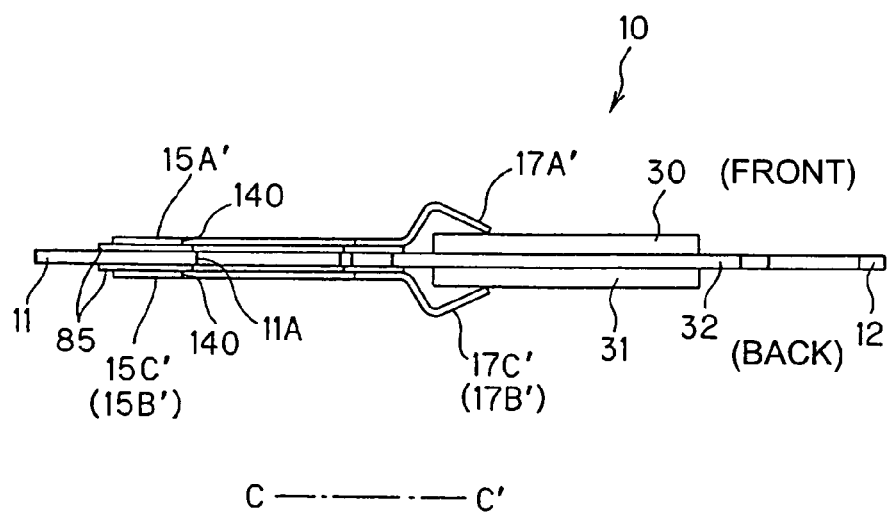
FIG. 23 is a section view through line C–C' in FIG. 21.

FIG. 21 is a plan view showing the top (front) of an oscillator 10 according to another embodiment of the invention, FIG. 22 is a plan view showing the bottom (back) of this oscillator 10, and FIG. 23 is a section view through line C–C' in FIG. 21. Note that the power supply electrodes 33A to 33D and detection electrode 34 are not shown in the section view in FIG. 23. As shown in these figures, lead substrate 14A in this embodiment of the invention comprises an insulation layer 85 and a metal layer 15A' bonded to the top of the insulation layer 85, and the lead substrate 14B comprises an insulation layer 85 and two physically separated metal layers 15B', 15C' bonded to the top of the insulation layer 85. This insulation layer 85 replaces the foregoing insulation layer 16, and metal layers 15A' to 15C' replace the foregoing copper foil layers 15A–15C. A flat spring 17A' is connected to metal layer 15A' as a wiring member for connection to the power supply electrode 33A, a flat spring 17B' is connected to metal layer 15B' as a wiring member for connection to the detection electrode 34, and flat spring 17C' is connected to metal layer 15C' as a wiring member for connection to the power supply electrode 33C. The flat springs 17A'–17C' can be welded or otherwise connected to the metal layers 15A'–15C', or these members can be integrally formed.

As shown in FIG. 23, flat spring 17A' is bent in an inverted V shape with the distal end contacting the power supply electrode 33A at a point from above the piezoelectric element 30, thereby reducing the load applied to the piezoelectric element 30 by contact with the flat spring 17A'. The distal ends of the other flat springs 17B', 17C' likewise contact the power supply electrode 33C and detection electrode 34 at a point from below the piezoelectric element 31, thereby reducing the load applied to the piezoelectric element 31 by contact with the flat springs 17B', 17C'. The wiring is thus prevented from interfering with oscillation of the oscillator 10.

By thus using flat springs 17A'–17C' for wiring between the lead substrates 14A, 14B and piezoelectric elements 30, 31, soldering, for example, is not needed to wire the piezoelectric elements 30, 31. Heat is therefore not used to wire the piezoelectric elements 30, 31, the piezoelectric elements 30, 31 are not affected by heat from the wiring process, and performance can thus be stabilized.

Figure 24:
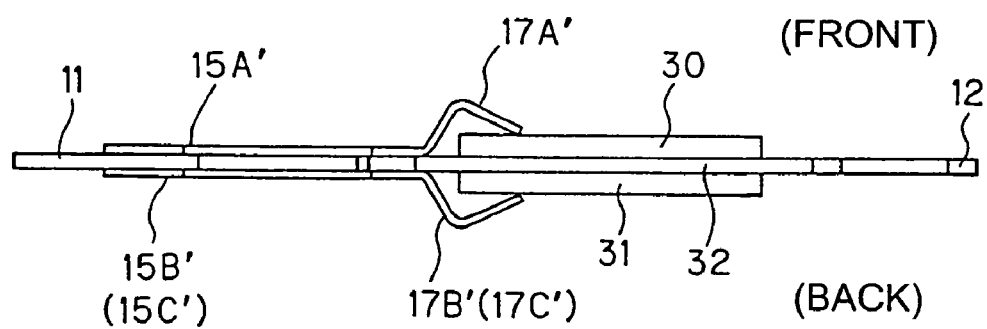
FIG. 24 is a section view showing the arrangement of the oscillator in another embodiment of the invention.

As shown in FIG. 24, the metal layers 15A'–15C' could be bonded to the fastening part 11 using a non-conductive adhesive instead of interposing an insulation layer 85 between the fastening part 11 and the metal layers 15A'–15C'. This arrangement reduces the number of parts needed for isolation, thus reducing cost and affording a thinner, smaller configuration.

Figure 25:
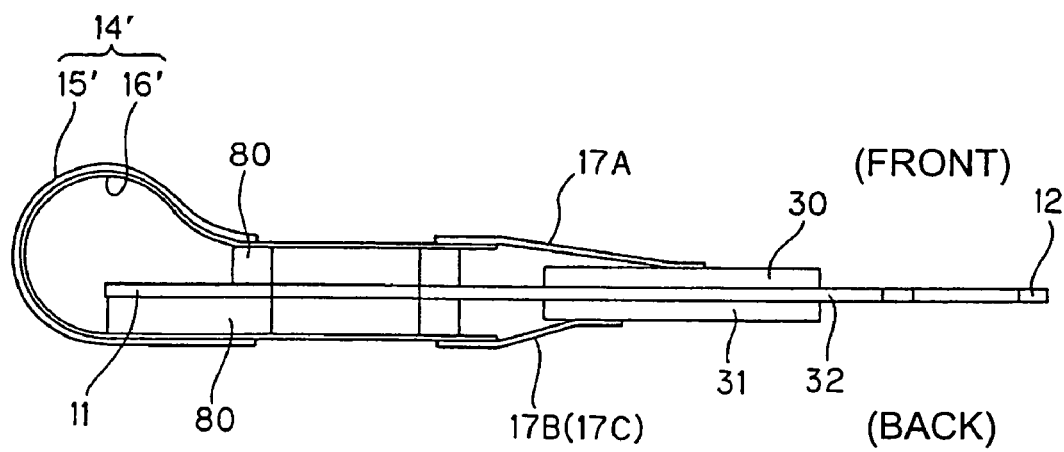
FIG. 25 is a section view showing the arrangement of the oscillator in another embodiment of the invention.

An arrangement using a conduction spring 37 to make an electrical connection to the lead substrates 14A, 14B is described by way of example above, but the invention shall not be so limited. More specifically, as shown in FIG. 25, the lead substrates 14A, 14B could be manufactured using a single flexible printed circuit 14'. This flexible printed circuit 14' has a copper foil 15' conduction pattern bonded to a dielectric sheet 16' of polyester, for example. When this flexible printed circuit 14' is attached to the fastening part 11, the dielectric sheet 16' is bonded to the height adjusting member 80 on the front or back side of the fastening part 11 so that the copper foil 15' is to the outside, then bent around the fastening part 11 and bonded to the opposite end of the height adjusting member 80 on the back or front side of the fastening part 11. As a result, compared with an arrangement using two substrates, that is, lead substrates 14A and 14B, the cost can be reduced and conductivity between the front and back sides of the fastening part 11 is easily provided.

E. Piezoelectric Actuator Drive Circuit

The drive circuit used in the calendar mechanism of a timepiece thus comprised is described next with reference to FIG. 26.

As shown in the figure, the drive circuit 500 has a midnight detection unit 501, control circuit 503, date advancing detection unit 502, and oscillation circuit 504. The midnight detection unit 501 is a mechanical switch assembled in the movement 73 (see FIG. 2) and outputs a control signal to the control circuit 503 when the time turns to 12:00 midnight. The main parts of the date advancing detection unit 502 are the foregoing spring 64 and contact 65 (see FIG. 1), and the date advancing detection unit 502 outputs a control signal to the control circuit 503 when the spring 64 and contact 65 make contact, that is, when completion of advancing the date is detected.

The control circuit 503 outputs an oscillation control signal to the oscillation circuit 504 based on the control signal supplied from the midnight detection unit 501 and the control signal supplied from the date advancing detection unit 502. This oscillation control signal goes from LOW to HIGH when midnight is detected by the midnight detection unit 501, and drops from HIGH to LOW when the date advancing detection unit 502 detects that the data has been advanced.

The oscillation circuit 504 is powered when this oscillation control signal goes HIGH, and power supply to the oscillation circuit 504 stops when the oscillation control signal goes LOW. When the oscillation control signal is HIGH, a drive signal of a specified frequency is supplied through the power supply electrodes 33A to 33D to the piezoelectric elements 30, 31. When this drive signal is thus applied, the piezoelectric elements 30, 31 expand and contract as described above.

As described above, the date-turning intermediate wheel 40 turns one revolution when the date changes, but this occurs only at a specific time at midnight. It is therefore sufficient for the oscillation circuit 504 to oscillate only during this time. By controlling the supply of power to the oscillation circuit 504 using a high or low level oscillation control signal in this drive circuit 500, operation of the oscillation circuit 504 is stopped completely when it is not necessary to drive the date-turning intermediate wheel 40. Unnecessary power consumption by the oscillation circuit 504 can thus be reduced.

Only one notch 4c is formed in the outside surface of the small diameter portion 4a of the date-turning intermediate wheel 40 in this embodiment, but if a plurality (such as four) of such notches are formed, the date-turning intermediate wheel 40 only needs to turn ¼ revolution to change the date.

F. Operation of the Calendar Display Mechanism

The automatic updating operation of a calendar display mechanism having a piezoelectric actuator A as described above is described next with reference to FIG. 1 and FIG. 26.

Figure 26:
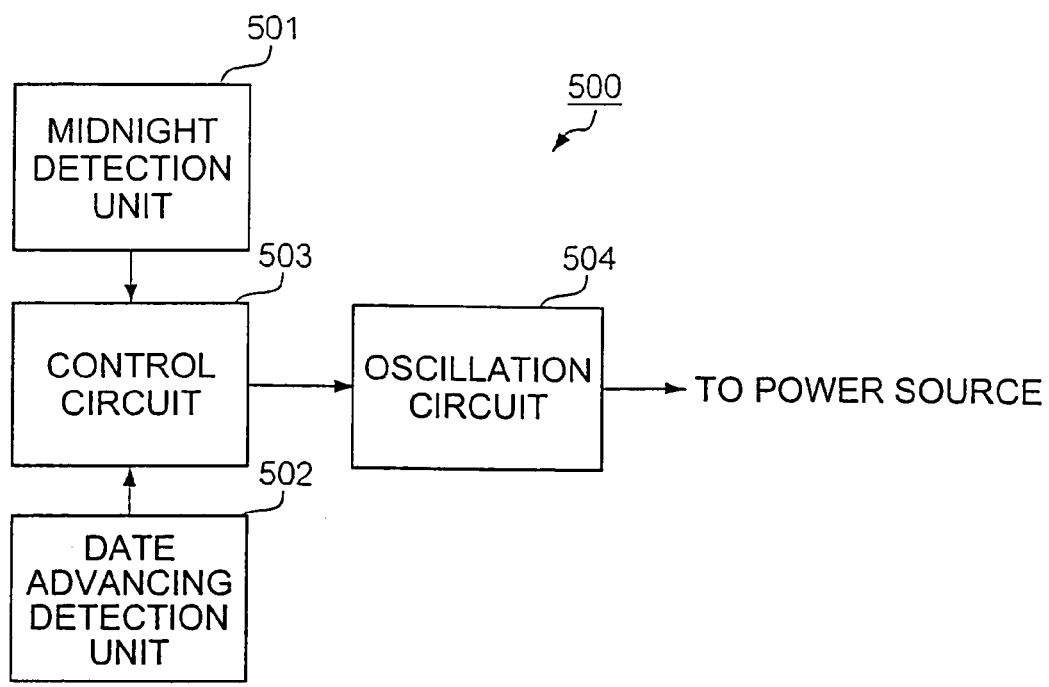
FIG. 26 shows the arrangement of a drive circuit for supplying a drive signal to the piezoelectric actuator in the same embodiment of the invention.

When the time turns to 12:00 midnight each day, the midnight detection unit 501 shown in FIG. 26 detects that midnight has come, and the oscillation control signal is output from the control circuit 503 to the oscillation circuit 504. As a result, a drive signal of a specific frequency is supplied from the oscillation circuit 504 through the power supply electrodes 33A to 33D to the piezoelectric elements 30, 31. When the drive signal is supplied from the drive circuit 500 to the power supply electrodes 33A to 33D, the piezoelectric elements 30, 31 vibrate due to expansion and contraction, and the oscillator 10 thus oscillates longitudinally.

If the piezoelectric elements 30, 31 are arranged so that the polarization directions of the piezoelectric elements are opposite as described above, the drive circuit 500 supplies AC drive signals so that the potential of the top, middle, and bottom are respectively +V, $V_{DD}$, +V (or -V, $V_{DD}$, -V).

When the oscillator 10 is thus electrically excited longitudinally, an imbalance in the weight balance of the oscillator 10 mechanically induces a bending oscillation. By combining the longitudinal oscillation and the bending oscillation, the contact part 36 oscillates along an elliptical path and drives the rotor 100.

As a result of the drive circuit 500 thus driving the oscillator 10 of the piezoelectric actuator A, the rotor 100 shown in FIG. 1 turns clockwise as seen in FIG. 1, and the date-turning intermediate wheel 40 thus begins to turn counterclockwise.

The drive circuit 500 stops supplying the drive signal when the spring 64 and contact 65 shown in FIG. 1 make contact. When the spring 64 and contact 65 touch, the distal end 64a has dropped into the notch 4c. The date-turning intermediate wheel 40 then starts turning.

Because the date-turning wheel 60 is urged clockwise by the spring 63, the small diameter portion 4a rotates while sliding in contact with the teeth 6a, 6b of the date-turning wheel 60. When the notch 4c then reaches the position of a tooth 6a of the date-turning wheel 60, that tooth 6a engages the notch 4c.

When the date-turning intermediate wheel 40 advances further counterclockwise, the date-turning wheel 60 moves in conjunction with the date-turning intermediate wheel 40 and turns clockwise one tooth, that is, ⅕ revolution. In conjunction therewith, the date display wheel 50 also turns clockwise the distance of one tooth (that is, the distance equal to one day). Note that in short months having less than 31 days, the foregoing operation repeats multiple times so that the date display wheel 50 displays the correct date according to the calendar.

The date-turning intermediate wheel 40 then continues advancing counterclockwise until the notch 4c reaches the position of the distal end 64a of the spring 64, at which point the spring 64 enters the notch 4c. The spring 64 and contact 65 thus make contact, drive signal supply ends, and the date-turning intermediate wheel 40 stops turning. The date-turning intermediate wheel 40 thus turns one revolution per day.

G. Adjusting the Amount of Pressure

The procedure whereby the pressure adjusting cam 26 is turned to adjust the amount of pressure applied by the rotor 100 to the oscillator 10 is described next.

When assembling the timepiece movement, the operator sets the movement containing the piezoelectric actuator A on a rotational speed sensor not shown to detect the speed of the rotor 100. This rotational speed sensor is preferably a laser displacement sensor or other sensor for detecting the rotational speed without contacting the piece being tested.

The operator then performs a specific operation to set the drive circuit 500 to an adjustment mode. This causes the control circuit 503 to output the oscillation control signal to the oscillation circuit 504, and the oscillation circuit 504 supplies drive signals of a specific frequency through the power supply electrodes 33A to 33D to the piezoelectric elements 30, 31. This causes the oscillator 10 to oscillate and begin driving the rotor 100 in conjunction with displacement of the contact part 36.

The operator then loosens the screw 27 using a screwdriver, inserts the adjustment terminal 29 to the terminal guide hole 26C, and gradually turns the pressure adjusting cam 26. While viewing the output from the speed sensor on a monitor not shown, for example, the operator turns the pressure adjusting cam 26 at least one revolution. The orientation of the pressure adjusting cam 26 is then adjusted to maximize the detection value output from the speed sensor. Once this position is determined, the operator tightens the screw 27 and fastens the pressure adjusting cam 26 to the base plate 102.

Note that the pressure can thus be adjusted manually by a procedure such as described above, or automatically using an automated assembly machine for automatically assembling timepiece movements.

H. Adjusting the Direction of the Pressure

The operator can thus manually adjust the amount of applied pressure as described above, but the direction in which this pressure is applied is also important from the perspective of improving the drive efficiency of the rotor 100.

This is described further below with the pressure applied from three different directions. Note that the spring members are not shown in the figures referenced below, and pressure can be applied to the oscillator whether a spring member is formed as part of the lever supporting the rotor 100, a separate spring member is provided, or only by the pressure on the rotor when the lever is attached.

Figure 27:
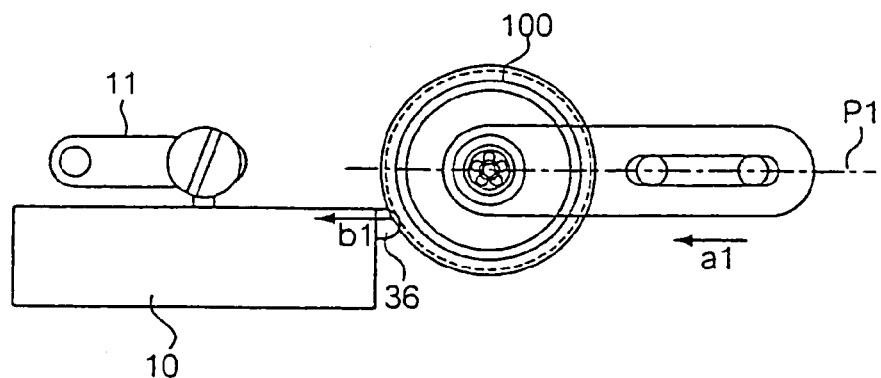
FIG. 27 is a plan view showing the relative positions of the oscillator and rotor when pressure is applied in a direction parallel to the oscillation direction of the oscillator in the same embodiment of the invention.

FIG. 27 is a plan view showing the relative positions of the rotor 100 and oscillator 10 when the direction of the pressure applied by the rotor 100 to the oscillator 10 is 0°. Imaginary line P1 shown in the figure indicates the direction in which the rotor 100 can move. This line P1 is substantially parallel to the direction of oscillator 10 oscillation. Applying force to the rotor 100 in the direction of arrow a1 applies pressure to the contact part 36 in the direction of arrow b1.

Figure 28:
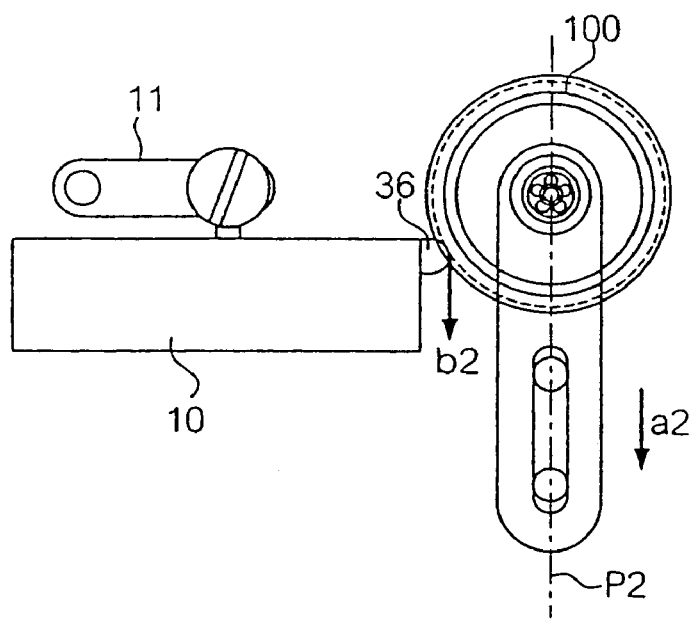
FIG. 28 is a plan view showing the relative positions of the oscillator and rotor when pressure is applied in a direction orthogonal to the oscillation direction of the oscillator in the same embodiment of the invention.
Figure 29:
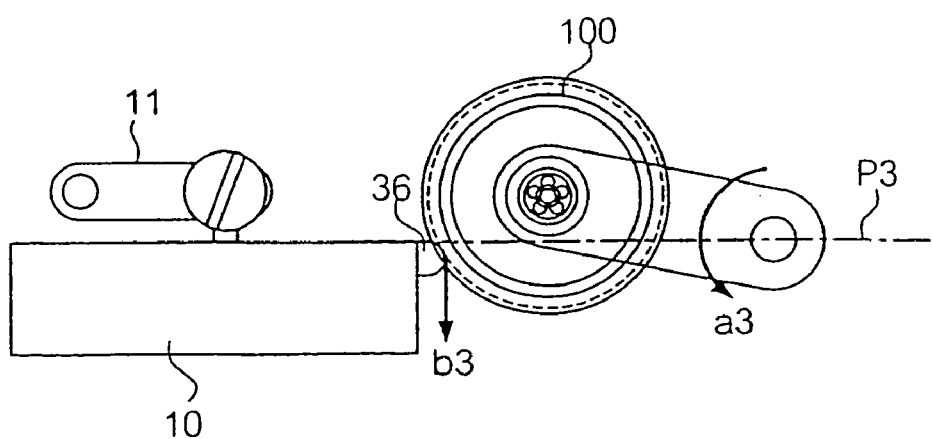
FIG. 29 is a plan view showing the relative positions of the oscillator and rotor when pressure is applied in a direction orthogonal to the oscillation direction of the oscillator in the same embodiment of the invention.

FIG. 28 and FIG. 29 are plan views showing the relative positions of the rotor 100 and oscillator 10 when the direction of the pressure applied by the rotor 100 to the oscillator 10 is 90°. Imaginary line P2 shown FIG. 28 indicates the direction in which the rotor 100 can move. This line P2 is substantially perpendicular to the oscillation direction of the oscillator 10. Applying force to the rotor 100 in the direction of arrow a2 applies pressure to the contact part 36 in the direction of arrow b2 (the direction perpendicular to the oscillation direction).

Imaginary line P3 shown in FIG. 29 extends in the direction of oscillator 10 oscillation from the point of contact between the rotor 100 and contact part 36. By locating the center of circular movement on this line P3, the rotor 100 exerts pressure at substantially 90° to the contact part 36. That is, by applying force to the rotor 100 in the direction of arrow a3, pressure is applied in the direction of arrow b3 (perpendicular to the oscillation direction) to the contact part 36.

Figure 30:
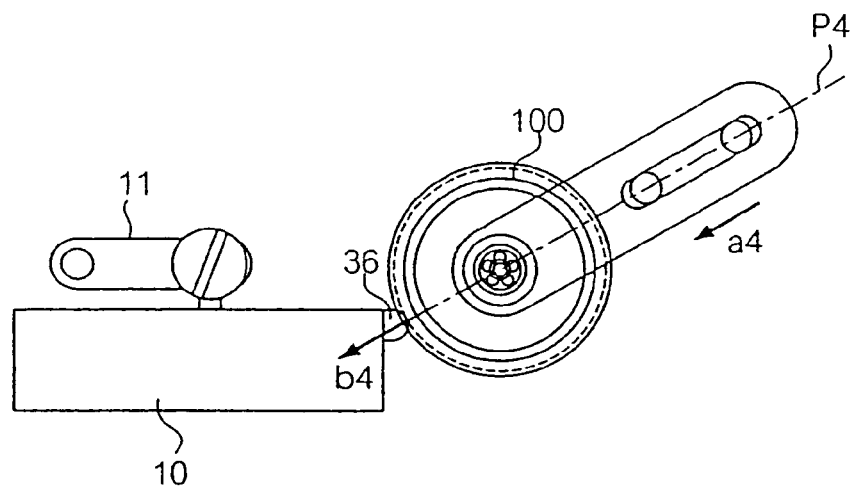
FIG. 30 is a plan view showing the relative positions of the oscillator and rotor when pressure is applied in a direction inclined 30° to the oscillation direction of the oscillator in the same embodiment of the invention.
Figure 31:
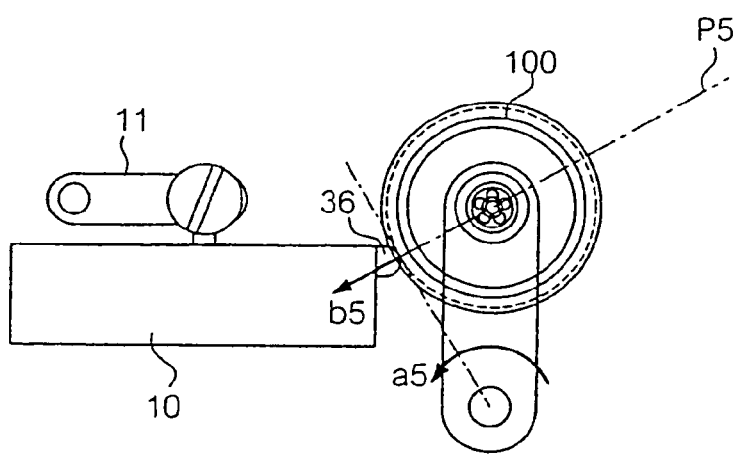
FIG. 31 is a plan view showing the relative positions of the oscillator and rotor when pressure is applied in a direction inclined 30° to the oscillation direction of the oscillator in the same embodiment of the invention.

FIG. 30 and FIG. 31 are plan views showing the relative positions of the rotor 100 and oscillator 10 when the direction of the pressure applied by the rotor 100 to the oscillator 10 is 30°. Imaginary line P4 shown FIG. 30 extends at a 30° angle to the oscillation direction of the oscillator 10 from the point of contact between the rotor 100 and contact part 36. Applying force to the rotor 100 in the direction of arrow a4 applies pressure to the contact part 36 in the direction of arrow b4 (that is, 30° to the oscillation direction).

Imaginary line P5 shown in FIG. 31 extends at an angle of 30° to the oscillation direction of the oscillator 10 from the point of contact between the rotor 100 and contact part 36. The center of circular movement of the rotor 100 is located on a line perpendicular to this line P5 through the position at which line P5 is tangent. As a result, the rotor 100 applies pressure at a substantially 30° angle to the contact part 36. In other words, applying force to the rotor 100 in the direction of arrow a5 applies pressure to the contact part 36 in the direction of arrow b5 (inclined 30° to the oscillation direction).

The directions in which pressure is applied in the preceding examples are described by way of example only, and the optimum direction will be determined according to such conditions as the shape and elastic characteristics of the spring part 23, the position and shape of the contact part 36, and the diameter of the rotor 100.

I. Shape of the Oscillator

To stabilize the drive characteristics of the piezoelectric actuator, the longitudinal oscillation and secondary bending oscillation produced by the oscillator must be stabilized so that the contact part on the distal end of the oscillator moves periodically always tracing the same path.

It is known in the art that "longitudinal oscillation and secondary lateral oscillation attenuate in a rectangular oscillator when the long side to short side ratio is 1:0.272." Note that this secondary lateral oscillation corresponds to the secondary bending oscillation in the present invention.

However, the oscillator used in a piezoelectric actuator is not a simple rectangular plate as described in the foregoing book, and has a contact part on the end. As a result, stable longitudinal oscillation and secondary bending oscillation cannot be achieved even if the ratio between long and short sides is as described.

By focusing on the effect of the mass (inertia) of this contact part on longitudinal oscillation and secondary bending oscillation, we determined the optimum length ratio between the long and short sides of an oscillator having this contact portion through the tests described below.

Figures 32, 33:
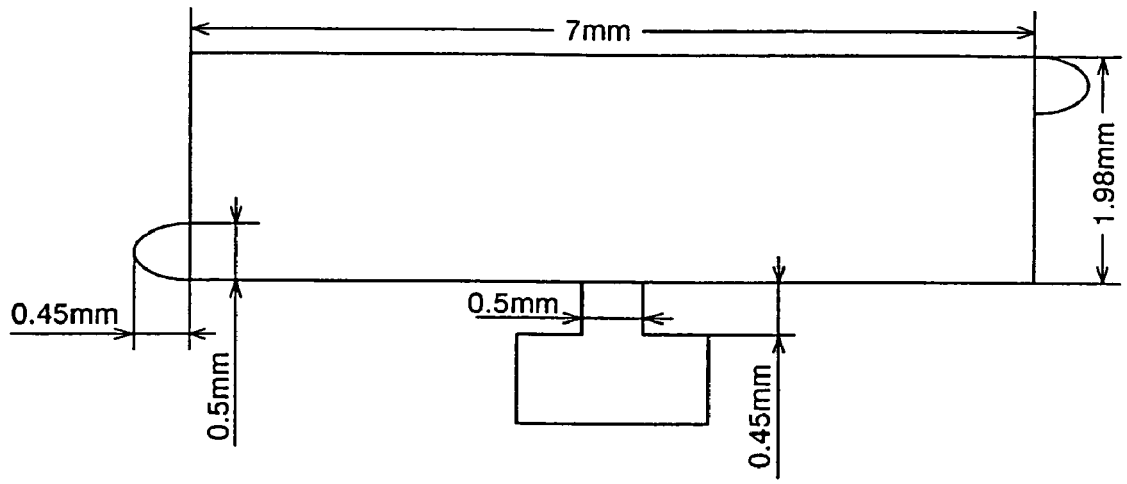
FIG. 32 is a plan view showing actual sizes of the oscillator.
FIG. 33 is a table showing the results of resonance frequency tests.

We assumed an oscillator 10 such as shown in FIG. 32. More specifically, the piezoelectric elements measure 7 mm on the long side and 1.98 mm on the short side, and are made of PZT. The base layer is 0.1 mm thick stainless steel (SUS301). The contact part is 0.5 mm wide, projects 0.45 mm, and has a mass of 0.16 mg. The extension to the fastening part is 0.4 mm wide and 0.5 mm long.

The results of oscillation simulations using oscillators thus comprised with contact parts and without contact parts are shown in FIG. 33. Note that the values shown in parentheses ( ) in FIG. 33 are the actual measurements. Based on the results shown in FIG. 33, we know that the presence of the contact part has a greater effect on secondary bending oscillation than on longitudinal oscillation, and providing this contact part increases the difference between the resonance frequency of the longitudinal oscillation and the resonance frequency of the secondary bending oscillation.

Reducing the difference between the resonance frequency of the longitudinal oscillation and the resonance frequency of the secondary bending oscillation that is increased by adding contact parts should thus effectively attenuate longitudinal oscillation and secondary bending oscillation.

If the length of the long side of the oscillator is a and the length of the short side is b, the resonance frequency f of the longitudinal oscillation mode is $$f=1/a$$

and the resonance frequency f of the secondary bending oscillation mode is $$f=b/a2.$$

Therefore, changing the length b of the short side reduces the difference between the resonance frequency of the longitudinal oscillation and secondary bending oscillation modes, and can cancel the effect of the contact parts.

Because the ratio of the sides at which dissipation occurs is b/a=1/0.272=7 mm/1.90 mm when no contact part is present, the ratio of the sides must be b/a=7 mm/1.92 mm=1/0.274 when contact parts are present.

As a point of reference, optimum experimental results were achieved when the length of the short sides was increased 0.06 mm to 1.98 mm. This is because when the resonance frequencies of the longitudinal oscillation mode and secondary bending oscillation mode are extremely close, a slight change in the drive frequency greatly changes the ratio between the two oscillation modes. The ratio of the sides at this time was b/a=1/0.283=7 mm/1.98 mm.

From the results of these tests, the optimum ratio of the sides b/a of an oscillator is in the range b/a≧0.274 (1>b/a).

J. Effects of the Invention

In a thin piezoelectric actuator A suitable for installation in limited space such as inside a timepiece, pressure is applied between the rotor 100 and oscillator 10 by pushing the rotor 100, which is the driven member, against the contact part 36 of the oscillator 10, and this pressure can be adjusted by rotating a pressure adjusting cam 26. Compared with the prior art in which pressure is produced by pushing the oscillator 10 against the rotor 100, this embodiment of the invention can fasten the oscillator 10 to the base plate 102 with no play (looseness). As a result, deterioration in the drive characteristics of the rotor 100 driven by vibration from the oscillator 10, and a drop in the durability of the oscillator 10, can be greatly improved.

The connecting parts 17A, 17B, 17C formed as extensions of the copper foil layers 15A, 15B, 15C on the lead substrates 14A, 14B are also used for wiring to the power supply electrodes 33A, 33C and detection electrode 34 in this embodiment of the invention. Wiring is therefore easier than in an arrangement in which lead wires or other discrete members are used to connect the oscillator 10 and lead substrates 14A, 14B, and manufacturability is thus improved.

The piezoelectric actuator A can also be efficiently driven by applying appropriate pressure to the oscillator 10.

K. Variations

The present invention shall not be limited to the foregoing embodiments, and can be varied in many ways such as described below.

(1) Arrangement of the Pressure Mechanism and Adjusting Mechanism

In the foregoing embodiments of the invention a lever 20 with a spring part 23 is used as the pressure mechanism for applying pressure to the oscillator 10 through the intervening rotor 100, and a pressure adjusting cam 26 is used as the adjustment mechanism for adjusting the applied pressure. The invention shall not be so limited, however, and can be varied as described below.

If there is available space between the oscillator 10 and base plate 102 as shown in FIG. 3, the spring part could be shaped to fit inside this space (such as using a flat spring or coil spring). The spring part could also be formed separately from the lever 20.

The adjusting mechanism is also not limited to the pressure adjusting cam 26, and any structure capable of adjusting the elastic force generated by the spring part can be used.

(2) Relative Positions of the Rotor 100 and Oscillator 10

The number of intermediate gears intervening between the rotor 100 and date display wheel 50 is not limited to that shown in the foregoing embodiments, and a desirable number of gears can be used. Because the direction of rotor 100 rotation is determined by the number of intermediate gears, the relative positions of the rotor 100 and oscillator 10 must be adjusted accordingly.

(3) Shape of the Oscillator 10

A oscillator 10 having two piezoelectric elements 30, 31 is described by way of example in the foregoing embodiment, but the present invention shall not be so limited and can be configured using an oscillator with only one piezoelectric element or a layered structure having three or more piezoelectric elements in the oscillator.

Furthermore, a rectangular oscillator 10 is used in the foregoing embodiments, but the shape of the oscillator 10 shall not be limited to a rectangle and could be any shape with a long direction, including a trapezoid, parallelogram, rhombus, or triangle.

Figure 34:
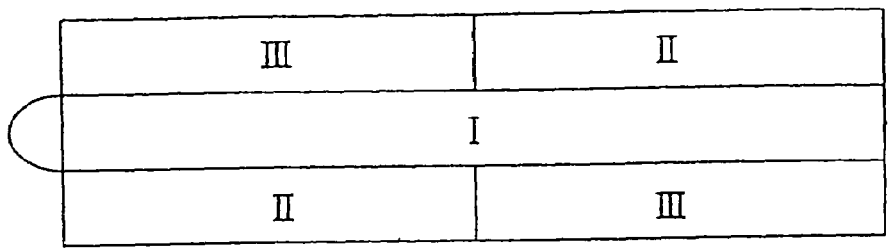
FIG. 34 is a plan view showing an alternative arrangement of the piezoelectric element electrodes of the oscillator.
Figure 35:
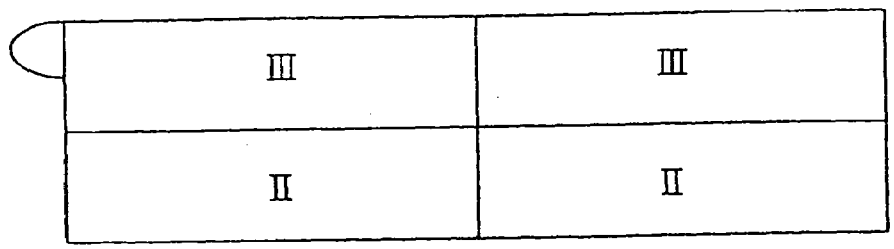
FIG. 35 is a plan view showing an alternative arrangement of the piezoelectric element electrodes of the oscillator.
Figure 36:
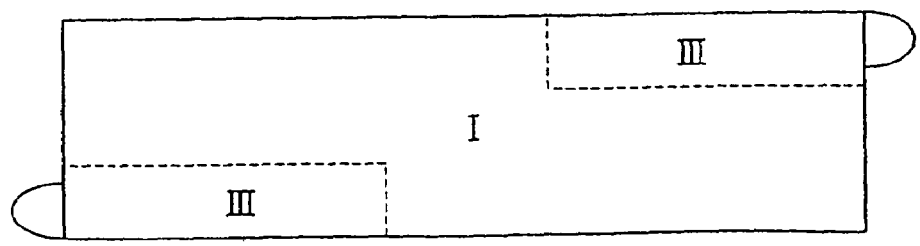
FIG. 36 is a plan view showing an alternative arrangement of the piezoelectric element electrodes of the oscillator.

The shape of the electrodes bonded to the piezoelectric elements shall also not be limited to the shape shown in FIG. 10, and could be formed to the piezoelectric elements as shown in FIG. 34 to FIG. 36.

For example, if the electrodes are formed as shown in FIG. 34, the oscillator is driven by supplying a drive signal to electrode I and electrode II. Longitudinal oscillation is produced from the electrode I part, oscillation is produced from the electrode II parts, and the electrode III parts do not vibrate. An imbalance relative to the longitudinal expansion and contraction is thus produced, a secondary bending oscillation is thereby excited, and the contact part is thus driven to oscillate along an elliptical path in a certain direction (such as clockwise). To drive the contact part in the opposite direction (counterclockwise in this example), drive signals are supplied to electrode I and electrode III. In this case, longitudinal oscillation is produced from the electrode I part, oscillation is produced from the electrode III parts, and the electrode II parts do not vibrate. This arrangement is useful for driving the contact part in forward and reverse directions, but if driving in only one direction is sufficient, electrode I and electrode II can be combined.

FIG. 35 shows a variation identical to that in FIG. 34 except that electrode I is eliminated. This oscillator can be driven in a longitudinal oscillation mode by supplying the drive signal to electrode II.

FIG. 36 shows an arrangement driven by a single electrode I covering the entire surface of the oscillator. A secondary bending oscillation is excited in this oscillator due to the unbalanced shape (contact parts). As indicated by the dotted lines, electrodes III creating a part of the piezoelectric element that does not vibrate can also be provided.

Furthermore, by screwing the fastening part 11 tight to the fastening part mounting portion 102A of the base plate 102 and setting the supporting contact portion 12 on the supporting contact portion mounting portion 102B of the base plate 102, the oscillator 10 has a cantilevered structure in the piezoelectric actuator A described above. However, the present invention shall not be so limited, and screwing the supporting contact portion 12 to the supporting contact portion mounting portion 102B similarly to the fastening part 11 affords a piezoelectric actuator in which the oscillator 10 is secured at both ends.

The foregoing piezoelectric actuator A also has the oscillator 10 and rotor 100 positioned on the base plate 102, but the invention shall not be limited to this base plate 102 and can use any structure that can support the parts of the piezoelectric actuator A.

(4) Variations of the Device Using the Piezoelectric Actuator

The foregoing embodiments are described by way of example using the piezoelectric actuator A as the piezoelectric actuator of a calendar display mechanism assembled into a timepiece. The present invention shall not be so limited, however, and can be used in a time display mechanism for displaying the time using hour, minute, and second hands.

The invention can also be used for the piezoelectric actuator of such electronic devices as small fans, toys, and other entertainment devices. The foregoing piezoelectric actuator A is also well suited as a piezoelectric actuator used in battery-powered portable devices because the piezoelectric actuator can be rendered thin and small while providing high drive efficiency.

(5) Driving the Piezoelectric Actuator A

The foregoing embodiments are described with the oscillation of the oscillator 10 rotationally driving a rotor 100 in contact with the contact part 36, but the invention shall not be so limited and can be applied to a piezoelectric actuator for driving the driven member linearly. Even in this arrangement the driven member applies pressure to the oscillator 10.

The piezoelectric actuator A in the foregoing embodiments causes the contact part 36 of the oscillator 10 to oscillate along an elliptical path in order to produce drive power for driving a rotor 100 with extremely low electrical energy such as in a wristwatch. The present invention shall not be so limited, however, and the rotor 100 could be rotationally driven by causing the contact part 36 to operate in a longitudinal oscillation mode aligned with the lengthwise direction of the oscillator 10.

(6) Shape of the Base Plate 102

Because the base plate 102 secures the oscillator 10, a fastening part mounting portion 102A for securing the fastening part 11 and a supporting contact portion mounting portion 102B for contacting the supporting contact portion 12 are rendered projecting from the base plate 102. The invention shall not be so limited, however, and a recess having an open portion for supporting the oscillator 10 using only the fastening part 11 and supporting contact portion 12 could be formed in the base plate 102.

(7) Calendar Display Mechanism

The calendar display mechanism in the foregoing embodiments is described as displaying only the date part of the calendar information, but it will be obvious that the calendar display mechanism could also display the day, month, and year.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A piezoelectric actuator having an oscillator that has a flat base layer and a piezoelectric element layer on the base layer, and the oscillator vibrates as a result of a drive signal applied to the piezoelectric element layer, and a driven member that is driven by vibration of the oscillator, the piezoelectric actuator comprising:
   a fastening part that secures the oscillator; and
   a lead substrate secured to the fastening part for applying a drive signal from a drive circuit for driving the piezoelectric element layer;
   wherein the lead substrate has a conductive member that extends to an electrode on the piezoelectric element layer; and
   wherein the conductive member is formed as a conductive elastic member that applies pressure to the electrode.

2. A timepiece comprising a piezoelectric actuator as described in claim 1, the timepiece further comprising:
   a drive circuit for outputting a drive signal for driving the oscillator;
   a power source for supplying power to the drive circuit; and
   a time information unit driven by the piezoelectric actuator for displaying time information including calendar information.

3. An electronic device comprising a piezoelectric actuator as described in claim 1, the electronic device further comprising:
   a drive circuit for outputting a drive signal for driving the oscillator;
   a power source for supplying power to the drive circuit; and
   a driven member driven by the piezoelectric actuator.

4. A piezoelectric actuator having an oscillator that has a flat base layer and a piezoelectric element layer on the base layer, and the oscillator vibrates as a result of a drive signal applied to the piezoelectric element layer, and a driven member that is driven by vibration of the oscillator, the piezoelectric actuator comprising:
   a fastening part that secures the oscillator; and
   a lead substrate secured to the fastening part for applying a drive signal from a drive circuit for driving the piezoelectric element layer;
   wherein the lead substrate has a conductive member that extends to an electrode on the piezoelectric element layer; and
   wherein:
   the lead substrate comprises a metal layer and an insulation layer or insulation sheet covering a surface of the metal layer; and
   the conductive member is a spring connected to or integrally formed with the metal layer.

5. A timepiece comprising a piezoelectric actuator as described in claim 4, the timepiece further comprising:
   a drive circuit for outputting a drive signal for driving the oscillator;
   a power source for supplying power to the drive circuit; and
   a time information unit driven by the piezoelectric actuator for displaying time information including calendar information.

6. An electronic device comprising a piezoelectric actuator as described in claim 4, the electronic device further comprising:
   a drive circuit for outputting a drive signal for driving the oscillator;
   a power source for supplying power to the drive circuit; and
   a driven member driven by the piezoelectric actuator.

7. A piezoelectric actuator having an oscillator that has a flat base layer and a piezoelectric element layer on the base layer, and the oscillator vibrates as a result of a drive signal applied to the piezoelectric element layer, and a driven member that is driven by vibration of the oscillator, the piezoelectric actuator comprising:
   a fastening part that secures the oscillator; and
   a lead substrate secured to the fastening part for applying a drive signal from a drive circuit for driving the piezoelectric element layer;
   wherein the lead substrate has a conductive member that extends to an electrode on the piezoelectric element layer; and
   further comprising a height adjusting member between the lead substrate and fastening part so that the conductive member extending from the lead substrate is higher than the piezoelectric element layer.

8. A timepiece comprising a piezoelectric actuator as described in claim 7, the timepiece further comprising:
   a drive circuit for outputting a drive signal for driving the oscillator;
   a power source for supplying power to the drive circuit; and
   a time information unit driven by the piezoelectric actuator for displaying time information including calendar information.

9. An electronic device comprising a piezoelectric actuator as described in claim 7, the electronic device further comprising:
   a drive circuit for outputting a drive signal for driving the oscillator;
   a power source for supplying power to the drive circuit; and
   a driven member driven by the piezoelectric actuator.

* * * * *